United States Patent
Koga

(10) Patent No.: US 10,551,534 B2
(45) Date of Patent: Feb. 4, 2020

(54) OPTICAL ELEMENT, OPTICAL SYSTEM, IMAGE PICKUP APPARATUS, AND LENS APPARATUS

(71) Applicant: CANON KABUSHIKI KAISHA, Tokyo (JP)

(72) Inventor: Hironobu Koga, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 131 days.

(21) Appl. No.: 15/468,897

(22) Filed: Mar. 24, 2017

(65) Prior Publication Data

US 2017/0285230 A1    Oct. 5, 2017

(30) Foreign Application Priority Data

Mar. 31, 2016 (JP) .................................. 2016-072992
Jul. 28, 2016  (JP) .................................. 2016-148938

(51) Int. Cl.
*G02B 5/20* (2006.01)
*G02B 5/22* (2006.01)

(52) U.S. Cl.
CPC ............... *G02B 5/205* (2013.01); *G02B 5/22* (2013.01)

(58) Field of Classification Search
CPC .......... G02B 5/205; G02B 5/20; G02B 5/005; G02B 5/22; G02B 5/201; G02B 13/0045; G02B 27/0025; G02B 5/003
USPC ....................................................... 359/888
See application file for complete search history.

(56) References Cited

U.S. PATENT DOCUMENTS

| | | | | |
|---|---|---|---|---|
| 2003/0086014 A1* | 5/2003 | Murata | .................. | G02B 5/005 348/363 |
| 2006/0068226 A1* | 3/2006 | Kunii | ...................... | C23C 14/54 428/702 |
| 2008/0024867 A1* | 1/2008 | Kawashima | ............ | C03C 17/36 359/586 |
| 2015/0192783 A1* | 7/2015 | Ishido | ................... | G02B 5/005 359/359 |

FOREIGN PATENT DOCUMENTS

| | | |
|---|---|---|
| JP | 2006-308810 A | 11/2006 |
| JP | 2007-178822 A | 7/2007 |
| JP | 2009-175225 A | 8/2009 |
| JP | 2009-288295 A | 12/2009 |
| JP | 2013-156619 A | 8/2013 |

* cited by examiner

*Primary Examiner* — Jade R Chwasz
(74) *Attorney, Agent, or Firm* — Canon U.S.A., Inc., IP Division

(57) ABSTRACT

An optical element includes a substrate, a surface layer including thin films disposed on the substrate, and an absorption layer provided between the surface layer and the substrate and having transmittance that varies depending on a position on the substrate. The surface layer includes a first film disposed farthest from the substrate and having a refractive index of no less than 1.05 nor more than 1.4 at a wavelength of 550 nm. The surface layer includes a second film disposed closer to the substrate than the first film and having a higher refractive index than the substrate at a wavelength of 550 nm and a third film disposed adjacent to the second film and having a lower refractive index than the second film at a wavelength of 550 nm. The absorption layer has an extinction coefficient of no more than 0.5 at wavelengths of from 400 nm to 700 nm.

19 Claims, 14 Drawing Sheets

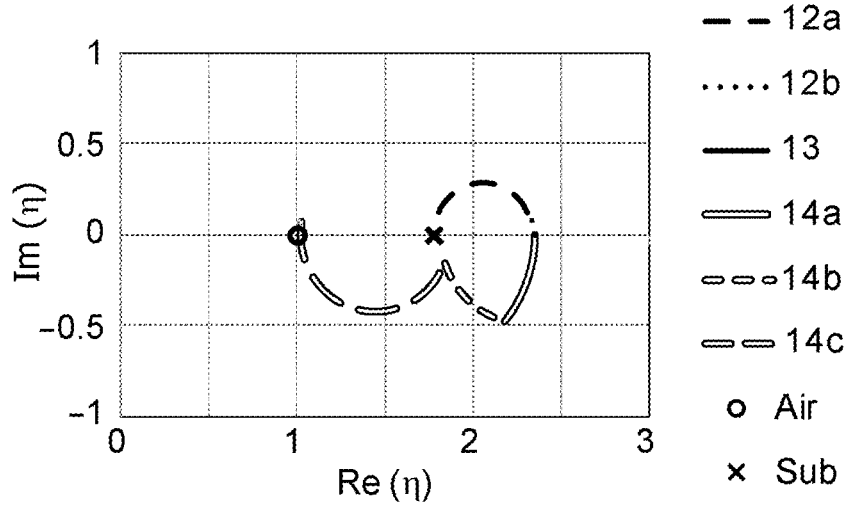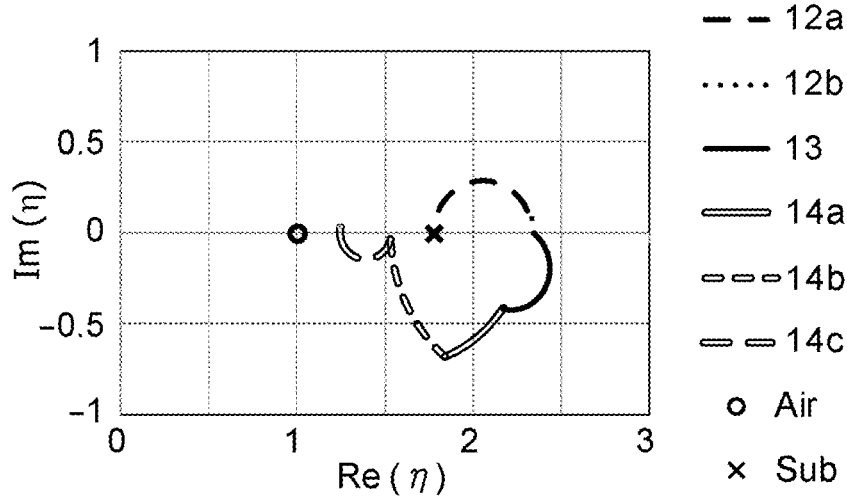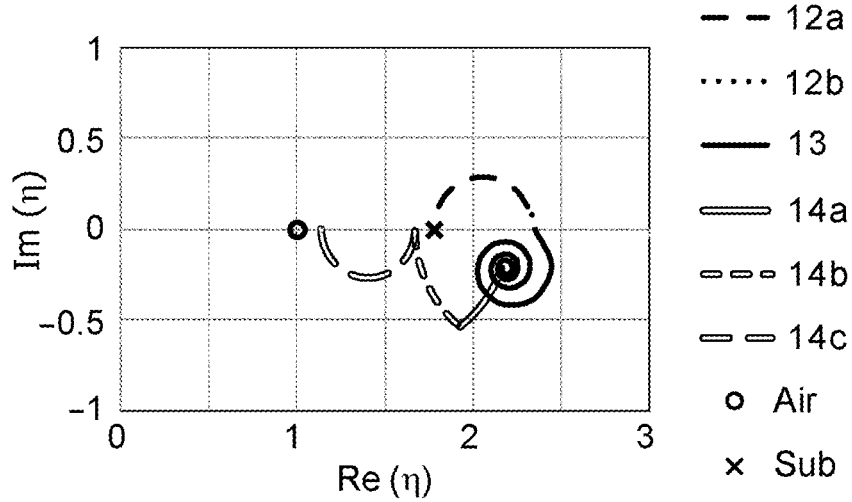

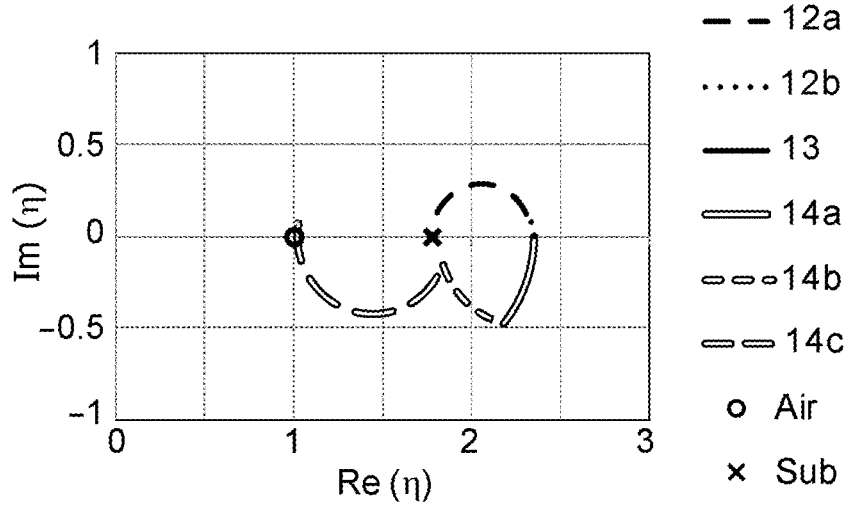
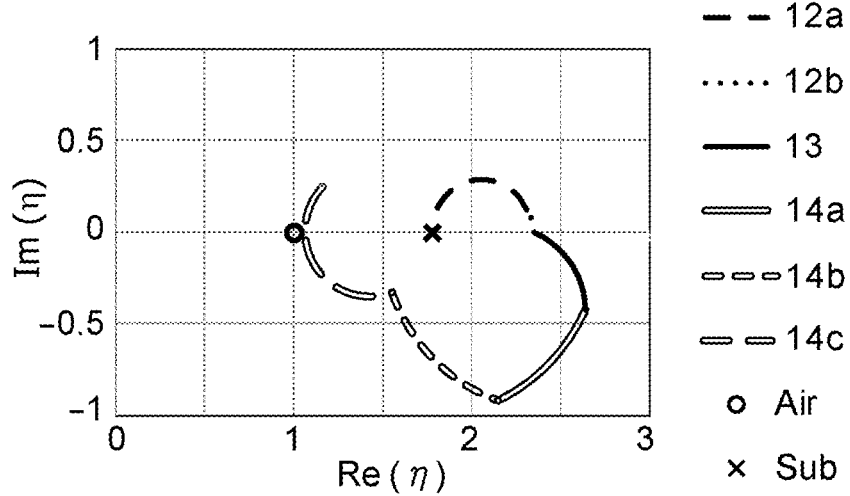
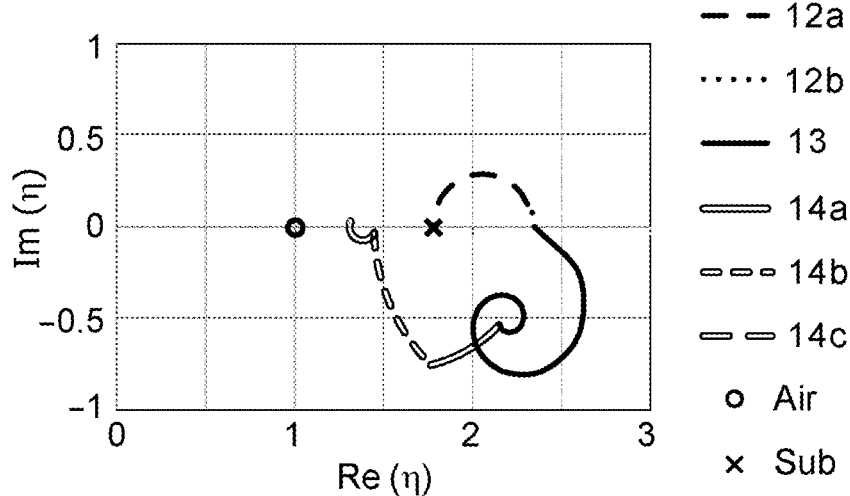

OPTICAL ELEMENT, OPTICAL SYSTEM, IMAGE PICKUP APPARATUS, AND LENS APPARATUS

BACKGROUND OF THE INVENTION

Field of the Invention

The present invention relates to optical elements for use in optical systems such as digital cameras.

Description of the Related Art

A gradated neutral density (ND) filter having transmittance distribution along the optical plane is known as an optical element for use in an optical system such as a digital camera. The use of a graduated ND filter (hereinafter, referred to as a GND filter) makes it possible to control the brightness of an image as desired or to reduce a variation in the sharpness of an outline of an out-of-focus image (blurred image).

Low reflectance is among the characteristics required for GND filters. This is because, when a GND filter is used in an optical system of an image pickup apparatus or the like, reflected light from the GND filter can cause flare, ghost, or similar image artifacts. In order to reduce the reflectance to a sufficient level, it is effective to provide a film having a low refractive index on the outermost surface of an anti-reflection layer.

Japanese Application Patent Laid-Open No. 2009-288295 discloses a GND filter with reduced reflectance. In this GND filter, a film made of a metal (absorption layer) and a film made of a metal oxide are laminated in an alternating manner on a substrate, and a layer made of a high polymer with a refractive index of 1.23 is provided on the outermost surface.

In the case of the GND filter disclosed in Japanese Application Patent Laid-Open No. 2009-288295, however, a metal having a large extinction coefficient is used as the absorption layer, and thus providing transmittance distribution by varying the thickness of the absorption layer leads to a noticeable change in the reflection condition depending on the position on the GND filter. Therefore, it is difficult to achieve low reflectance throughout the GND filter even with the layer having a low refractive index made of a high polymer being provided on the outermost surface.

SUMMARY OF THE INVENTION

The present invention is directed to providing an optical element capable of reducing a change in the reflectance associated with a change in the transmittance of an absorption layer.

The present invention provides an optical element that includes a substrate, a surface layer including a plurality of thin films disposed on the substrate, and an absorption layer that is provided between the surface layer and the substrate and has transmittance that varies depending on a position on the substrate. The surface layer includes a first film disposed at a position farthest from the substrate, and the first film has a refractive index of no less than 1.05 nor more than 1.4 at a wavelength of 550 nm. The surface layer includes a second film disposed at a position closer to the substrate than the first film and having a higher refractive index than the substrate at a wavelength of 550 nm and a third film disposed at a position adjacent to the second film and having a lower refractive index than the second film at a wavelength of 550 nm. The absorption layer has an extinction coefficient of no more than 0.5 at wavelengths of from 400 nm to 700 nm.

Further features of the present invention will become apparent from the following description of exemplary embodiments with reference to the attached drawings.

BRIEF DESCRIPTION OF THE DRAWINGS

FIGS. 2A, 2B, and 2C are admittance path diagrams obtained when the extinction coefficient of an absorption layer is 0.218.

FIGS. 3A, 3B, and 3C are admittance path diagrams obtained when the extinction coefficient of an absorption layer is 0.5.

DESCRIPTION OF THE EMBODIMENTS

Figure 1:
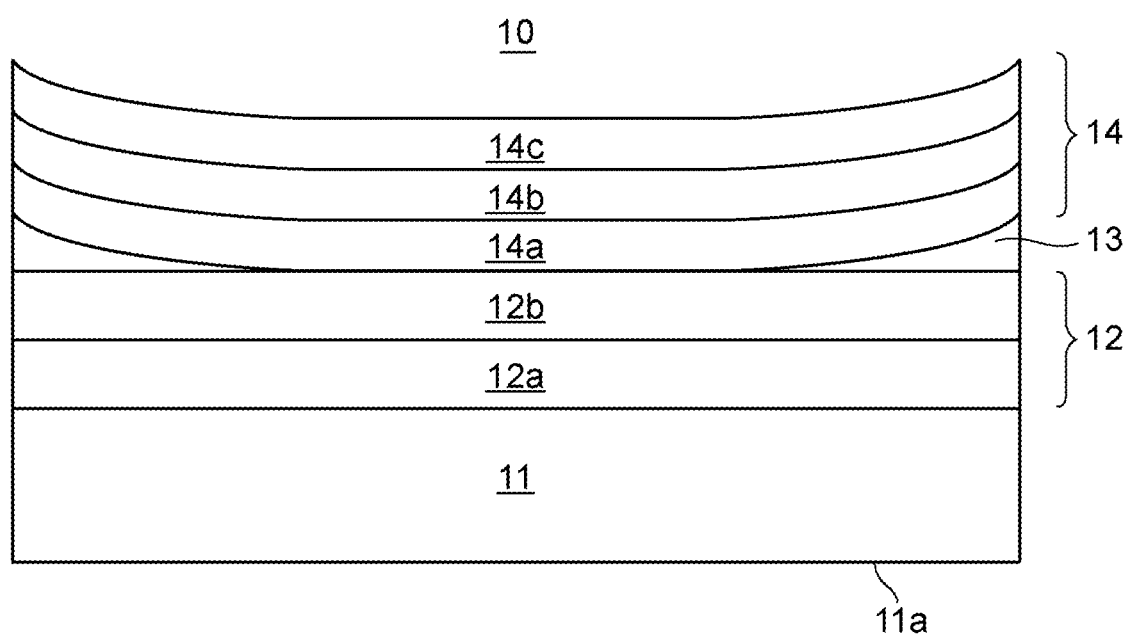
FIG. 1 is a schematic diagram of a GND filter.

Hereinafter, exemplary embodiments of the present invention will be described with reference to the drawings. Identical parts are given identical reference characters across the drawings, and duplicate descriptions of such parts will be omitted.

FIG. 1 is a schematic diagram illustrating a GND filter 10, which serves as an optical element according to an exemplary embodiment of the present invention. The GND filter 10 according to the present exemplary embodiment includes a substrate 11, a surface layer 14, and an absorption layer 13 configured to absorb a portion of incident light. The absorption layer 13 is disposed between the surface layer 14 and the substrate 11.

The surface layer 14 is constituted by at least three thin films. Specifically, the surface layer 14 includes a first film 14c, a second film 14b having a higher refractive index than the substrate 11 at a wavelength of 550 nm, and a third film 14a having a lower refractive index than the second film 14b at a wavelength of 550 nm. The first film 14c is disposed within the surface layer 14 at a position farthest from the substrate 11 and has a refractive index of no less than 1.05 nor more than 1.4 at a wavelength of 550 nm. The second film 14b is disposed within the surface layer 14 at a position closer to the substrate 11 than the first film 14c. The third film 14a is disposed within the surface layer 14 at a position adjacent to the second film 14b.

The absorption layer 13 has an extinction coefficient of no more than 0.5 at wavelengths of from 400 nm to 700 nm, and a portion of light incident on the GND filter 10 is absorbed by the absorption layer 13. The thickness of the absorption layer 13 varies depending on the position on the substrate 11. This configuration allows the absorption layer 13 to have transmittance that varies depending on the position on the substrate 11.

As illustrated in FIG. 1, an intermediate layer 12 may further be provided between the absorption layer 13 and the substrate 11. Layers (not illustrated) identical to those described above may be laminated on a back surface 11a of the substrate 11 or an anti-reflection film (not illustrated) may be provided on the back surface 11a.

In general, when the transmittance of an absorption layer changes, so does its reflectance. Thus, it is different to reduce the reflectance of a region having varying transmittance. However, the GND filter 10 includes an absorption layer that satisfies the expression (2) described later and a surface layer such as the one described above, and thus a change in the reflectance associated with a change in the transmittance of the absorption layer can be reduced.

FIGS. 2A through 2C and 3A through 3C are admittance path diagrams of the GND filter 10 that is provided with the intermediate layer 12. FIGS. 2A through 2C illustrate the admittance paths obtained when the extinction coefficient of the absorption layer 13 is small, and FIGS. 3A through 3C illustrate the admittance paths obtained when the extinction coefficient of the absorption layer 13 is larger than that in FIGS. 2A through 2C. The intermediate layer 12 includes two thin films and is constituted by thin films 12a and 12b laminated on the substrate 11 in this order.

Admittance (optical admittance) is a value expressed by a ratio between the magnetic field strength and the electric field strength of a beam of light incident within a medium. When the admittance $Y_0$ in a vacuum serves as a base unit, the refractive index of a medium becomes numerically equivalent to the admittance. An admittance path diagram expresses a film characteristic with the use of a concept of equivalent admittance. Equivalent admittance refers to admittance of a case in which an entire system including a thin film on a substrate is replaced with a single substrate having equivalent characteristics.

Details on the equivalent admittance and the admittance path diagram are well known to persons having ordinary skill in the art. An example is given in Lee, C. C. (2002): kougaku hakumaku to seimaku gijutsu [optical thin films and coating techniques] (ULVAC, Inc. Trans.).

FIGS. 2A through 2C illustrate the admittance path diagrams of the GND filter 10 in which the extinction coefficient of the absorption layer 13 is 0.218. FIGS. 2A, 2B, and 2C are the admittance path diagrams obtained when light is incident on the GND filter 10 from the air side at positions where the transmittance is, respectively, 100%, 79%, and 10%. The GND filter 10 has a lower transmittance at a position where the absorption layer 13 is thicker. Specifically, FIG. 2A illustrates the admittance path at a position where the thickness of the absorption layer 13 is 0, and the thickness of the absorption layer 13 is greater in FIG. 2B and even greater in FIG. 2C.

With the admittance path diagram illustrated in FIG. 2A taken as an example, how the admittance path diagram is to be interpreted will now be described. In each of FIGS. 2A through 2C, the horizontal axis represents the real part Re($\eta$) of the admittance $\eta$ with $Y_0$ serving as a base unit, and the vertical axis represents the imaginary part Im($\eta$). The cross sign (×) in each of the figures indicates the admittance of substrate 11, and the open circle (○) indicates the admittance of air. When the refractive index of the substrate 11 is represented by $N_{sub}$, the admittance of the substrate 11 with $Y_0$ serving as a base unit becomes equal to $N_{sub}$. In the meantime, when some light is absorbed, the admittance in that case becomes equal to the value of the complex refractive index N-ik. Here, N is the refractive index, and k is the extinction coefficient.

The path illustrated in FIG. 2A illustrates a change in the equivalent admittance when the thin films 12a and 12b serving as the intermediate layer, the absorption layer 13, and the third, second, and first films 14a, 14b, and 14c serving as the surface layer are deposited in this order on the substrate 11. The end point of the path when the first film 14c has been deposited represents the final equivalent admittance, and the Fresnel coefficient and the reflectance can be calculated from the aforementioned equivalent admittance and the admittance of the air (=1). When the equivalent admittance is equal to the admittance of the air, the reflectance becomes 0.

FIG. 2A illustrates a case in which the thickness of the absorption layer 13 is 0. As the thickness of the absorption layer 13 increases and the transmittance thus decreases, the admittance path changes to the one illustrated in FIG. 2B and to the one illustrated in FIG. 2C. As the thickness of the absorption layer 13 increases, the equivalent admittance from the substrate 11 to the absorption layer 13 changes in a swirling manner and converges to a point substantially equal to the complex refractive index of the absorption layer 13 in the end.

A comparison between the case in which the thickness of the absorption layer 13 is 0 as illustrated in FIG. 2A and the case in which the absorption layer 13 is sufficiently thick as illustrated in FIG. 2C indicates that the equivalent admittance changes by an amount corresponding to the extinction coefficient k=0.218.

In this manner, when the extinction coefficient of the absorption layer 13 is 0.218, the equivalent admittance from the substrate 11 to the absorption layer 13 changes as illustrated in FIGS. 2A through 2C. Here, FIGS. 2A through 2C reveal that the change in the equivalent admittance from the substrate 11 to the first film 14c with respect to the change in the equivalent admittance from the substrate 11 to the absorption layer 13 becomes smaller. This is because the surface layer 14 is provided on the upper surface of the absorption layer 13; that is, the surface layer 14 is the outer most layer of the GND filter 10.

The surface layer 14 of the GND filter 10 has a structure in which the second film 14b and the third film 14a are laminated adjacent to each other. When the second film 14b and the third film 14a are laminated adjacent to each other, a V-shaped path appears in the admittance path diagram, as illustrated in FIGS. 2A through 2C.

A case in which the equivalent admittance from the substrate 11 to the absorption layer 13 changes from the one illustrated in FIG. 2A to the one illustrated in FIG. 2B in association with a change in the transmittance of the absorption layer 13 will now be considered. In this case, the admittance path of the third film 14a is shorter in the case illustrated in FIG. 2B than in the case illustrated in FIG. 2A. In contrast, the admittance path of the second film 14b is longer in the case illustrated in FIG. 2B than in the case illustrated in FIG. 2A.

In other words, the admittance paths of the third film 14a and the second film 14b change so as to compensate for each other's changes. This allows the amount of change in the equivalent admittance associated with a change in the transmittance of the absorption layer 13 to be reduced.

In order to bring the final equivalent admittance closer to the admittance of the air, a film having a small refractive index is provided to serve as the first film 14c of the surface layer 14. In order to reduce the reflectance, it is preferable that the refractive index of the first film 14c be small. Therefore, the refractive index $n_s$ of the first film 14c satisfies the following conditional expression (1) at a wavelength of 550 nm.

$$1.05 \leq n_s \leq 1.4 \tag{1}$$

When $n_s$ is greater than 1.4, it is difficult to sufficiently reduce the change in the reflectance associated with a change in the transmittance of the absorption layer 13. When $n_s$ is smaller than 1.05, it is difficult to fabricate the first film 14c.

In order to further reduce the change in the reflectance associated with a change in the transmittance of the absorption layer 13, it is preferable that the range of the expression (1) be set as in the following expression (1a).

$$1.05 \leq n_s \leq 1.3 \tag{1a}$$

Next, the admittance path diagrams of the GND filter 10 in which the extinction coefficient is 0.5 are illustrated in FIGS. 3A through 3C to serve as an example of the case in which the extinction coefficient of the absorption layer 13 is large. FIGS. 3A, 3B, and 3C are the admittance path diagrams obtained when light is incident on such a GND filter 10 from the air side at positions where the transmittance is, respectively, 100%, 79%, and 10%. As illustrated in FIG. 3C, when the absorption layer 13 is sufficiently thick, the equivalent admittance from the substrate 11 to the absorption layer 13 becomes substantially equal to the complex refractive index of the absorption layer 13.

A comparison between the case in which the thickness of the absorption layer 13 is 0 as illustrated in FIG. 3A and the case in which the absorption layer 13 is sufficiently thick as illustrated in FIG. 3C indicates that the equivalent admittance changes by an amount corresponding to the extinction coefficient k=0.5. With regard to the change in the equivalent admittance from the substrate 11 to the absorption layer 13 associated with a change in the transmittance of the absorption layer 13, a comparison between FIGS. 3A, 3B, and 3C and FIGS. 2A, 2B, and 2C reveals that the change is greater in those illustrated in FIGS. 3A, 3B, and 3C. This is because the extinction coefficient of the absorption layer 13 is greater in the cases illustrated in FIGS. 3A, 3B, and 3C than in the cases illustrated in FIGS. 2A, 2B, and 2C.

When the extinction coefficient of the absorption layer 13 exceeds 0.5, the change in the equivalent admittance becomes even greater than those illustrated in FIGS. 3A, 3B, and 3C. In this case, it is difficult to reduce the reflectance to a sufficient level even if the surface layer 14 is provided. Therefore, in order to reduce the change in the reflectance associated with a change in the transmittance of the absorption layer 13, the extinction coefficient k of the absorption layer 13 satisfies the following conditional expression (2) at wavelengths of from 400 nm to 700 nm.

$$0 < k \leq 0.5 \tag{2}$$

As the extinction coefficient k of the absorption layer 13 satisfies the expression (2) and the surface layer 14 is provided on the upper surface of the absorption layer 13, the change in the reflectance associated with a change in the transmittance of the absorption layer 13 can be reduced.

As the extinction coefficient of the absorption layer 13 is greater, the absorption layer 13 can be made thinner. With this configuration, the deposition time can be reduced when the absorption layer 13 is formed through vapor deposition, sputtering, or the like. Furthermore, as the absorption layer 13 is thinner, a phase shift in a transmitted wavefront to be caused by the absorption layer 13 can be reduced. Therefore, it is preferable that the range in the expression (2) be set to the range as in the following expression (2a).

$$0.005 \leq k \leq 0.5 \tag{2a}$$

It is more preferable that the range in the expression (2) be set to the range as in the following expression (2b).

$$0.05 \leq k \leq 0.4 \tag{2b}$$

As the absolute value of the difference between the refractive index of the second film 14b and the refractive index of the third film 14a is greater, the effect of reducing the amount of change in the equivalent admittance associated with a change in the transmittance of the absorption layer 13 increases. Therefore, it is preferable that the absolute value of the difference between the refractive indices of the second film 14b and the third film 14a that are adjacent to each other be no less than 0.4.

Figure 15:
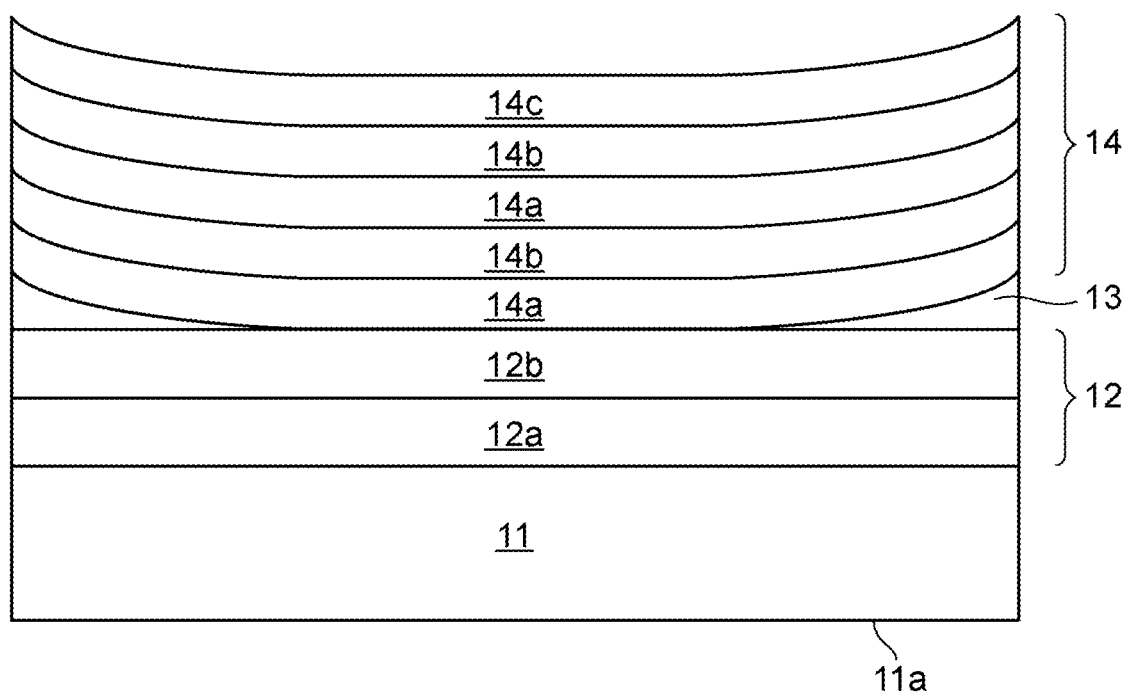
FIG. 15 is a schematic diagram of a GND filter in which a second film and a third film are laminated in an alternating manner for a total of four films.

In order to further reduce the amount of change in the equivalent admittance associated with a change in the transmittance of the absorption layer 13, it is preferable that the third film 14a and the second film 14b be laminated in an alternating manner for a total of no less than four films, as shown in FIG. 15.

In order to further reduce the change in the reflectance associated with a change in the transmittance of the absorption layer 13 in a case in which light is incident on the GND filter from the air side, it is preferable that the following conditional expression (3) be satisfied at a wavelength of 550 nm.

$$|Re(\eta_{sub})/Y_0 - N_{abs,int}| < 0.25 \tag{3}$$

In the above, $\eta_{sub}$ is the equivalent admittance from the substrate 11 to the intermediate layer 12, and $N_{abs,int}$ is the refractive index of a film within the absorption layer 13 that is closest to the intermediate layer 12. $Re(\eta_{sub})$ is divided by $Y_0$ in order to treat the unit of $Re(\eta_{sub})$ as $Y_0$.

The expression (3) indicates that the real part of the equivalent admittance from the substrate 11 to the intermediate layer 12 in the GND filter 10 is a value close to the refractive index of the absorption layer 13. As the expression (3) is satisfied, the change in the equivalent admittance from the substrate 11 to the absorption layer 13 associated with a change in the transmittance of the absorption layer 13 can be further reduced. Consequently, the change in the reflectance associated with a change in the transmittance of the absorption layer 13 can be further reduced. It is more preferable that the range in the expression (3) be set as in the following expression (3a).

$$|Re(\eta_{sub})/Y_0 - N_{abs,int}| < 0.15 \quad (3a)$$

Although the intermediate layer 12 that satisfies the expression (3) is provided in the GND filter 10, setting the refractive index of the absorption layer 13 and the refractive index of the substrate 11 to values close to each other can also provide an effect similar to that obtained by satisfying the expression (3).

In the foregoing, the reflectance in the case in which light is incident on the GND filter 10 from the air side has been described. However, when the absorption film 13 that absorbs a portion of incident light is provided as in the GND filter 10, the reflectance differs in between the case in which light is incident from the air side and the case in which light is incident from the substrate 11 side. This is because, when the absorption layer 13 is provided, the Fresnel coefficient differs at respective interfaces in the GND filter 10 depending on the direction in which light is incident.

In order to reduce the reflectance of light incident from the substrate 11 side, the intermediate layer 12 may be provided between the absorption layer 13 and the substrate 11, as illustrated in FIG. 1.

When the refractive index of the substrate 11 is $N_{sub}$, the intermediate layer 12 may include a film having a refractive index that lies between $N_{abs,int}$ and $N_{sub}$. Furthermore, the intermediate layer 12 may include a film having a higher refractive index than the substrate 11 and a film having a lower refractive index than the stated film that are laminated in an alternating manner. This configuration makes it possible to reduce the change in the reflectance associated with a change in the transmittance of the absorption layer 13 even in a case in which light is incident from the substrate 11 side.

In order to reduce the change in the equivalent admittance from the air to the absorption layer 13, it is preferable that the following conditional expression (4) be satisfied at a wavelength of 550 nm.

$$|Re(\eta_{air})/Y_0 - N_{abs,sur}| < 0.25 \quad (4)$$

In the above, $\eta_{air}$ is the equivalent admittance from the air to the surface layer 14. In addition, $N_{abs,sur}$ is the refractive index of a film within the absorption layer 13 that is closest to the surface layer 14. When the absorption layer 13 is formed by a single film, $N_{abs,sur}$ and $N_{abs,int}$ take the same value. In contrast, when the absorption layer 13 is constituted by two absorption films as described later, $N_{abs,sur}$ and $N_{abs,int}$ take different values.

That the expression (4) is satisfied indicates that the real part of the equivalent admittance from the air to the surface layer 14 in the GND filter 10 is a value close the refractive index of the absorption layer 13. This configuration makes it possible to further reduce the change in the equivalent admittance from the air to the absorption layer 13 associated with a change in the transmittance of the absorption layer 13. Consequently, the change in the reflectance associated with a change in the transmittance of the absorption layer 13 can be further reduced. It is more preferable that the range in the expression (4) be set as in the following expression (4a).

$$|Re(\eta_{air})/Y_0 - N_{abs,sur}| < 0.15 \quad (4a)$$

As the expression (3) and the expression (4) are both satisfied, the change in the reflectance associated with a change in the transmittance of the absorption layer 13 can be reduced in either of the case in which light is incident from the air side and the case in which light is incident from the substrate 11 side.

Furthermore, when the absorption layer 13 includes a region in which its thickness is 0 provided at the center of the GND filter 10, as illustrated in FIG. 1, the absorption layer 13 is not present between the intermediate layer 12 and the surface layer 14 in the stated region. In this case, it is preferable that the surface layer 14 and the intermediate layer 12 be designed so as to satisfy the following expression (5).

$$|Re(\eta_{air})/Y_0 - Re(\eta_{sub})/Y_0| < 0.3 \quad (5)$$

As the expression (5) is satisfied, the reflectance can be reduced even in a region in which the thickness of the absorption layer 13 is 0.

Materials that constitute the GND filter 10 will now be described.

Glass, plastics, or the like can be used to form the substrate 11. The shape of the substrate 11 may be a planar lens shape, a convex lens shape, a concave lens shape, or the like. When the GND filter 10 is to be disposed in an optical system of an image pickup apparatus such as a digital camera, setting the shape of the substrate 11 to a lens shape makes it possible to save space for disposing the GND filter and to reduce the size of the optical system.

It suffices that the first film 14c have a refractive index that satisfies the expression (1) described above. Examples of the materials that satisfy the expression (1) include magnesium fluoride ($MgF_2$). The use of a film having an air gap formed therein (hereinafter, referred to as a hollow film) can yield a film having an even lower refractive index than a uniform film made of magnesium fluoride. This is because the air contained in the air gap can reduce the effective refractive index of the film.

When a hollow film is used as the first film 14c, the hollow film may be formed by bonding fine particles containing magnesium fluoride or silica ($SiO_2$). This is because magnesium fluoride and silica are materials with a low refractive index, and thus the effective refractive index can be reduced even if the air gap is not increased excessively when the hollow film is formed. The fine particles may be hollow particles or solid particles. The fine particles may be porous particles as well. It is preferable that the particle size of the fine particles be no more than 40 nm. This is because, when the particle size of the fine particles is too large, light is scattered by the particles.

Figure 4A:
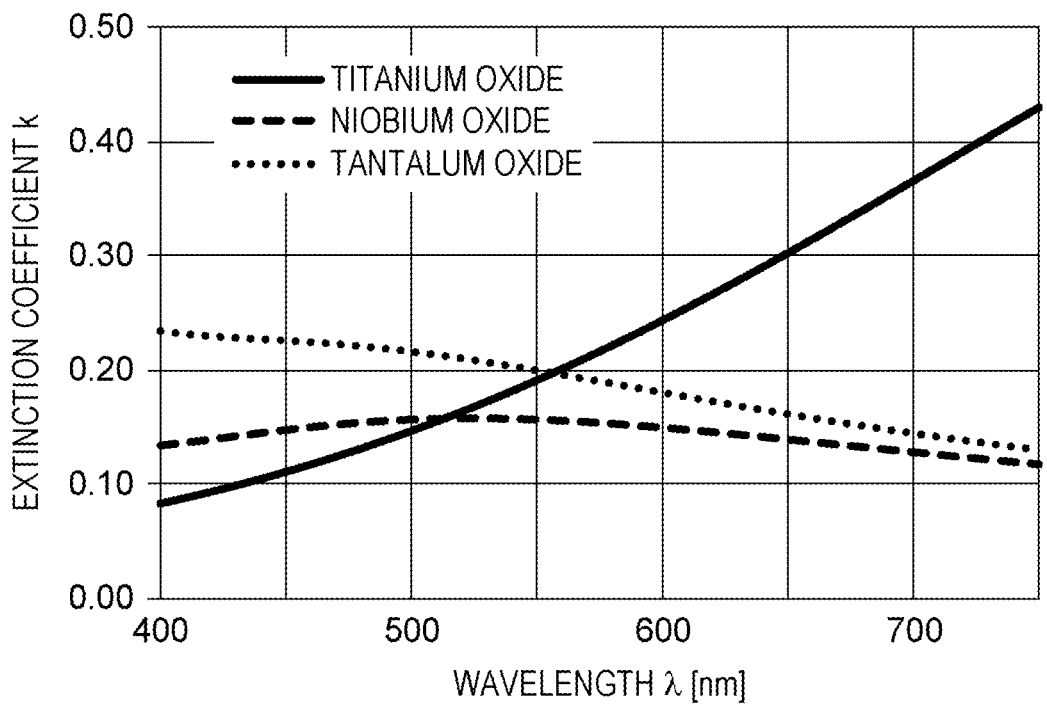
FIGS. 4A and 4B illustrate examples of wavelength dependence of the extinction coefficient and the absorption coefficient, respectively.

It suffices that the absorption layer 13 have an extinction coefficient that satisfies the expression (2) described above at wavelengths of from 400 nm to 700 nm. Examples of the materials that satisfy the expression (2) include metal oxides such as titanium oxide, niobium oxide, or tantalum oxide. FIG. 4A illustrates the wavelength dependence of the extinction coefficient of titanium oxide, niobium oxide, and tantalum oxide. As illustrated in FIG. 4A, the extinction coefficients of these material satisfy the expression (2) described above at wavelengths of from 400 nm to 700 nm.

The absorption layer 13 may be constituted by a combination of a plurality of types of metal oxides or the like. Forming the absorption layer 13 by combining two materials that differ in the wavelength dependence of the absorption coefficient makes it possible to reduce the wavelength dependence of the transmittance of the GND filter 10. This configuration makes it possible to reduce coloring of an image caused by the GND filter 10 when the GND filter 10 is used in an optical system or the like of an image pickup apparatus.

Figure 5:
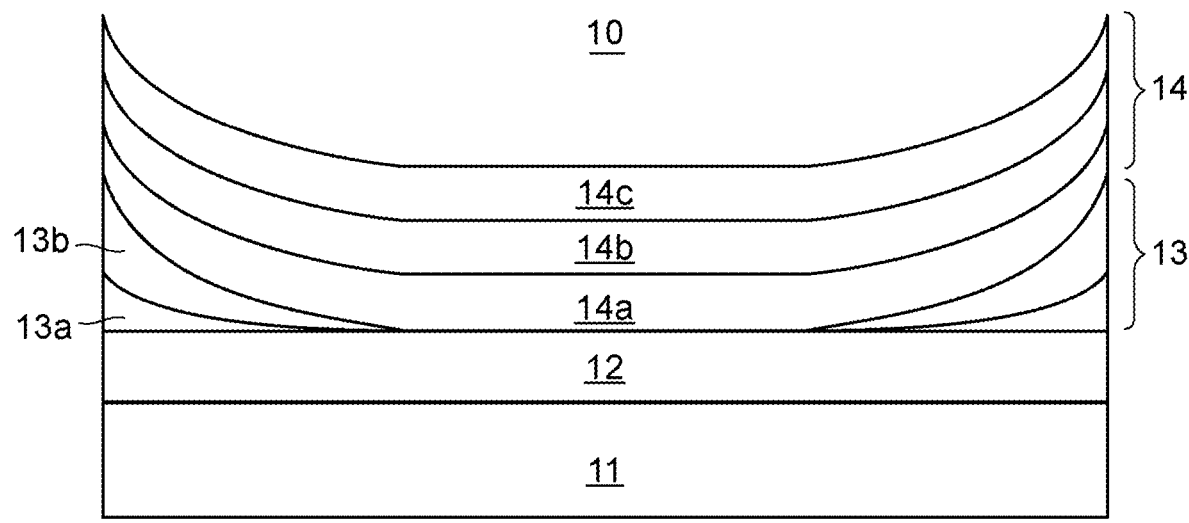
FIG. 5 is a schematic diagram of a GND filter in which an absorption layer includes a first absorption film and a second absorption film.

FIG. 5 illustrates a GND filter 10 in which an absorption layer 13 includes a first absorption film 13a and a second absorption film 13b as an example in which the absorption layer 13 is formed by combining two materials. The first absorption film 13a contains a first material that satisfies the following conditional expression (6a). The second absorption film 13b contains a second material that satisfies the following conditional expression (6b).

$$\alpha_1(400) < \alpha_1(700) \quad (6a)$$

$$\alpha_2(400) > \alpha_2(700) \quad (6b)$$

In the above, $\alpha_1(\lambda)$ is the absorption coefficient of the first material and $\alpha_2(\lambda)$ is the absorption coefficient of the second material. The numerical values in the parentheses in the expression (6a) and the expression (6b) represent the wavelengths of light in the unit of nanometer (nm). Specifically, the expression (6a) indicates that the absorption coefficient of the first material is smaller at a wavelength of 400 nm than at a wavelength of 700 nm. The expression (6b) indicates that the absorption coefficient of the second material is greater at a wavelength of 400 nm than at a wavelength of 700 nm.

The absorption coefficient $\alpha(\lambda)$ is a value given by $\alpha(\lambda) = 4\pi k(\lambda)/\lambda$, in which $k(\lambda)$ is the extinction coefficient dependent on the wavelength.

A reason why the wavelength dependence of the transmittance can be reduced as the expression (6a) and the expression (6b) are satisfied will be described. The intensity of incident light is represented by $I_0$, and the thickness of a film having the absorption coefficient $\alpha(\lambda)$ is represented by t. Then, the intensity I of light transmitted through the absorption film is given by the following expression (7).

$$I = I_0 \cdot \exp(-\alpha(\lambda) \cdot t) \quad (7)$$

The expression (7) shows that the wavelength dependence of the intensity of the transmitted light originates from the wavelength dependence of the absorption coefficient. Therefore, in order to reduce the wavelength dependence of the transmittance, the wavelength dependence of $\alpha(\lambda)$ may be reduced.

As described above, the first material absorbs light on a longer wavelength side more than light on a shorter wavelength side. The second material absorbs light on a shorter wavelength side than light on a longer wavelength side. For such first and second materials, there is a wavelength band in which the absorption coefficient of one of the materials increases with respect to the wavelength and the absorption coefficient of the other material decreases with respect to the wavelength (hereinafter, referred to as a wavelength band with opposite signs) in at least a portion of the wavelength range of from 400 nm to 700 nm.

In the wavelength band with opposite signs, the absorption coefficient of the first material and the absorption coefficient of the second material are in a relation of canceling out each other's wavelength dependences. Therefore, the wavelength dependence of the absorption coefficient of the absorption layer 13 can be reduced as a whole, and a flat absorption coefficient can be obtained.

It is also conceivable that a wavelength band in which the absorption coefficients of both materials increase or decrease (hereinafter, referred to as a wavelength band with the same sign) is present within the wavelength range of from 400 nm to 700 nm even when the first material and the second material satisfy the expression (6a) and the expression (6b), respectively.

However, the absorption coefficient of the absorption layer 13 takes a value obtained by adding the absorption coefficients of the first material and the second material in accordance with the ratio of the thickness of the first absorption film 13a and the thickness of the second absorption film 13b. Therefore, the wavelength dependence of the absorption coefficient of the absorption layer 13 in the wavelength band with the same sign does not exceed the wavelength dependence of the absorption coefficient of either one of the first material and the second material having greater wavelength dependence in the stated wavelength band.

Thus, as the expression (6a) and the expression (6b) are satisfied, the wavelength dependence of the absorption coefficient of the absorption layer 13 can be reduced, and the wavelength dependence of the transmittance of the absorption layer 13 can be reduced as a result.

Figure 4B:
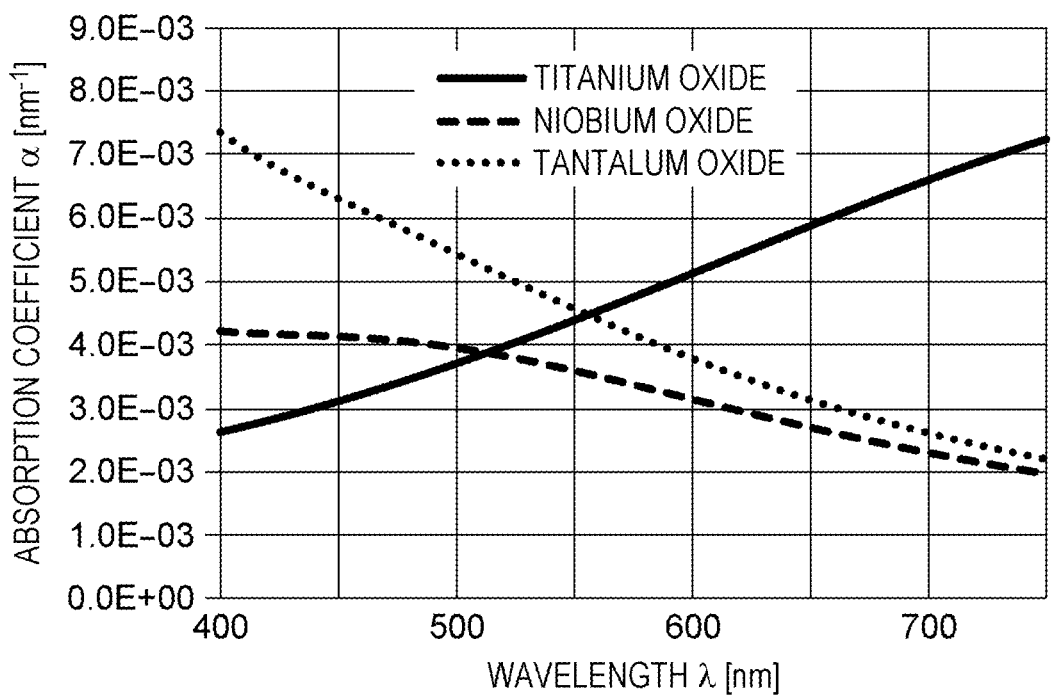

FIG. 4B illustrates the wavelength dependence of the absorption coefficient of each of the materials indicated in FIG. 4A. FIG. 4B reveals that the expression (6a) and the expression (6b) can be satisfied when titanium oxide is selected as the first material and niobium oxide or tantalum oxide is selected as the second material. In this case, the entire wavelength band ranging from 400 nm to 700 nm corresponds the wavelength band with opposite signs.

The combination of materials that can reduce the wavelength dependence of the transmittance of the absorption layer 13 is not limited to the one mentioned above, and any combination of materials that satisfy the expression (6a) and the expression (6b) may be selected in accordance with the characteristics.

In FIG. 5, the absorption layer 13 is constituted by the first absorption film 13a and the second absorption film 13b laminated on each other. The extinction coefficient of the absorption layer 13 in this case changes at the interface between the first absorption film 13a and the second absorption film 13b, but the absorption layer 13 satisfies the expression (2) as long as the first absorption film 13a and the second absorption film 13b both satisfy the expression (2) described above.

Specifically, the extinction coefficient of the absorption layer 13 illustrated in FIG. 5 is equal to the extinction coefficient of the first material in the first absorption film 13a and is equal to the extinction coefficient of the second material in the second absorption film 13b. In this case, it suffices that the extinction coefficient of the first material and the extinction coefficient of the second material be both within the range indicated by the expression (2).

Figure 6:
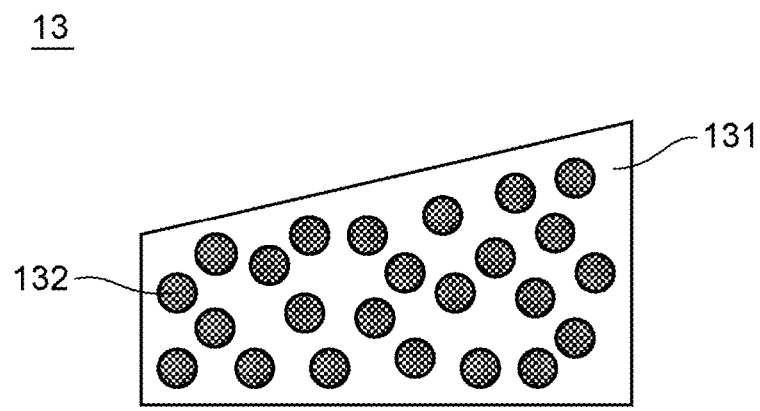
FIG. 6 is a schematic diagram of a GND filter in which an absorption layer is formed of a resin with fine particles made of a material having a light absorbing property dispersed therein.

The absorption layer 13 is not limited to a uniform film formed through vapor deposition, sputtering, or the like. As illustrated in FIG. 6, the absorption layer 13 can also be formed by dispersing fine particles 132 formed of a material having a light absorbing property in a resin 131. FIG. 6 is an enlarged view of a portion of the absorption layer 13.

In this case, the extinction coefficient of the absorption layer 13 can be obtained by calculating the absorption coefficient $\alpha(\lambda)$ from the amount of light absorption and the thickness of the absorption layer 13 and by using the relational expression $\alpha(\lambda) = 4\pi k(\lambda)/\lambda$ on the basis of the calculated absorption coefficient. It suffices that the extinction coefficient obtained in this manner satisfy the expression (2) described above at wavelengths of from 400 nm to 700 nm.

When the absorption layer 13 is formed in such a manner as illustrated in FIG. 6, the first material and the second material that satisfy the expression (6a) and the expression (6b), respectively, described above may be turned into fine particles and dispersed in a resin. This configuration makes it possible to reduce the wavelength dependence of the absorption coefficient of the absorption layer 13 and to reduce the wavelength dependence of the transmittance of the absorption layer 13 as a result.

Next, compensation for a phase shift in a transmitted wavefront caused by the absorption layer will be described. The GND filter 10 includes the absorption layer 13 of which the thickness varies depending on the position on the substrate. Therefore, it is conceivable that a phase shift corresponding to the thickness of the absorption layer 13 occurs in the transmitted wavefront of light transmitted through the absorption layer 13. In order to compensate for such a phase shift in the transmitted wavefront, a phase compensation layer 32 or 43 of which the thickness varies depending on the position on the substrate may further be provided as in a GND filter 30 illustrated in FIG. 10A or a GND filter 40 illustrated in FIG. 12A.

Figure 10A:
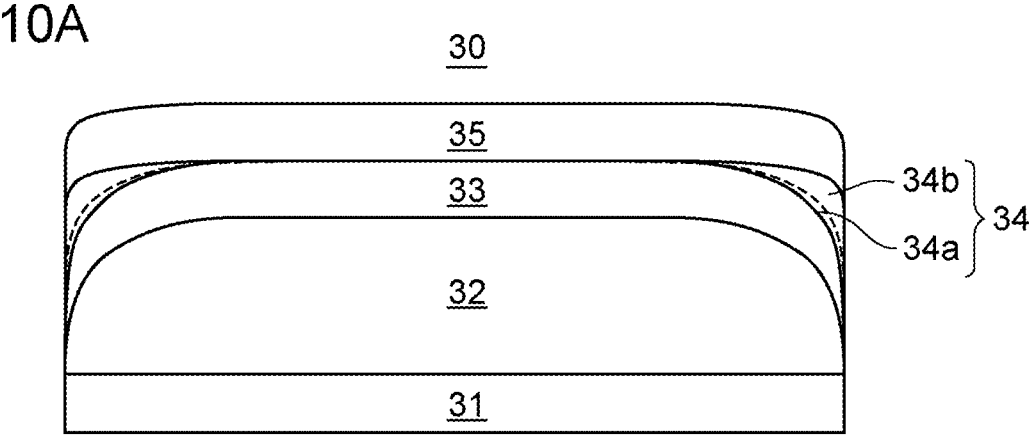
FIG. 10A is a schematic diagram of a GND filter according to a third example.
Figure 10B:
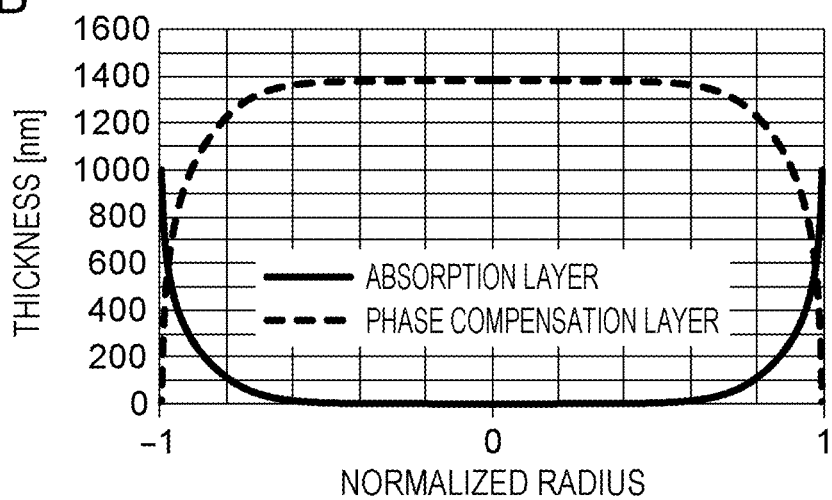
FIG. 10B illustrates the thickness of an absorption layer and the thickness of a phase compensation layer.

FIG. 10B illustrates the thickness of an absorption layer 34 in the GND filter 30 having the phase compensation layer 32 and the thickness of the phase compensation layer 32. The vertical axis represents the thickness, and the horizontal axis represents the position within a plane normalized by the radius of the GND filter 30. As illustrated in FIG. 10B, the thickness of the absorption layer 34 increases from the center of the GND filter 30 toward the periphery, whereas the thickness of the phase compensation layer 32 decreases from the center toward the periphery.

In other words, the thickness of the phase compensation layer 32 increases in the direction opposite to the direction in which the thickness of the absorption layer 34 increases. It is to be noted that the thickness of the absorption layer 34 is the sum of the thickness of a first absorption film 34$a$ and the thickness of a second absorption film 34$b$.

In order to favorably correct the phase shift in the transmitted wavefront, it is preferable that the thickness of the phase compensation layer 32 be varied so as to satisfy the following conditional expression (8).

$$|\Delta OPD/\lambda| \leq 0.30 \tag{8}$$

In the above, $\lambda$ is the wavelength of light, and $\Delta OPD$ is the difference between the optical path length at the position at which the absorption layer 34 is thinnest and the optical path length at the position at which the absorption layer 34 is thickest. In other words, $\Delta OPD$ is the optical path length difference with the position at which the absorption layer 34 is thinnest serving as a reference. In the GND filter 30, the difference between the optical path length at the position indicated by the normalized radius of 0 (the center portion of the GND filter 30) and the optical path length at another position corresponds to $\Delta OPD$. The optical path length as used herein refers to an amount defined by the sum of the products of the refractive indices of the respective films laminated on a substrate 31 and the thicknesses of the respective films.

Figure 10C:
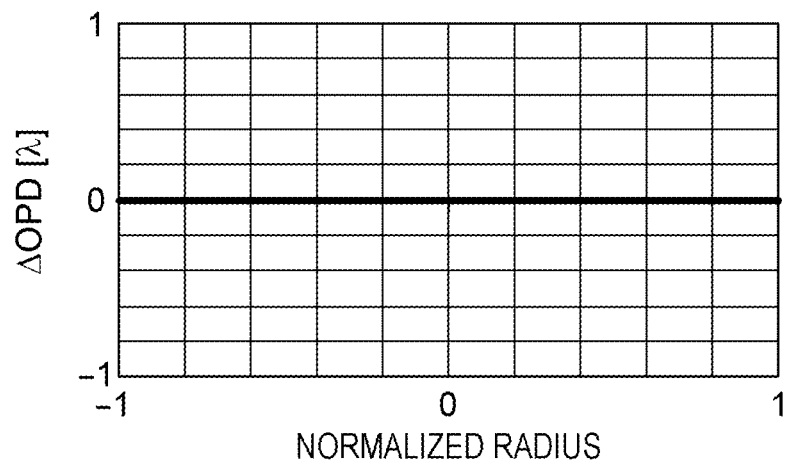
FIG. 10C illustrates ΔOPD.

As the expression (8) is satisfied, $\Delta OPD$ associated with a change in the thickness of the absorption layer 32 can be compensated as illustrated in FIG. 10C.

The complex refractive index of the absorption layer and the complex refractive index of the phase compensation layer differ from each other, and thus it is difficult to make the admittance of the phase compensation layer coincide with the admittance of the absorption layer regardless of the thickness of the absorption layer. Therefore, the reflectance also changes in association with a change in the thickness of the phase compensation layer.

When the phase compensation layer is disposed closer to the substrate than the absorption layer, the change in the reflectance associated with a change in the thickness of the phase compensation layer and the absorption layer tends to be greater in the case in which light is incident from the air side than in the case in which light is incident from the substrate side. In contrast, when the absorption layer is disposed closer to the substrate than the phase compensation layer, the change in the reflectance associated with a change in the thickness of the phase compensation layer and the absorption layer tends to be greater in the case in which light is incident from the substrate side than in the case in which light is incident from the air side.

In this manner, the tendency of the change in the reflectance associated with a change in the thickness of the absorption layer and the phase compensation layer differs depending on the position at which the phase compensation layer is disposed and on the direction in which light is incident. Typically, it is easier to reduce the reflectance when light is incident from the substrate side than to reduce the reflectance when light is incident from the air side. Therefore, in order to reduce the reflectance when light is incident from the air side and the reflectance when light is incident from the substrate side in a balanced manner, the phase compensation layer may be disposed between the substrate and the absorption layer.

When the phase compensation layer 32 is disposed at the position adjacent to the substrate 31 as in the GND filter 30, it is preferable that the following conditional expression (9) be satisfied.

$$|N_{sub} - N_{cmp}| < 0.10 \tag{9}$$

In the above, $N_{sub}$ is the refractive index of the substrate 31 with respect to light at a wavelength of 550 nm, and $N_{cmp}$ is the refractive index of the phase compensation layer 32 with respect to light at a wavelength of 550 nm.

As the expression (9) is satisfied, the reflectance at the interface between the substrate 31 and the phase compensation layer 32 can be reduced, and the change in the reflectance associated with a change in the thickness of the phase compensation layer can be reduced as a result. It is more preferable that the range in the expression (9) be set to the following range.

$$|N_{sub} - N_{cmp}| < 0.05 \tag{9a}$$

Figure 12A:
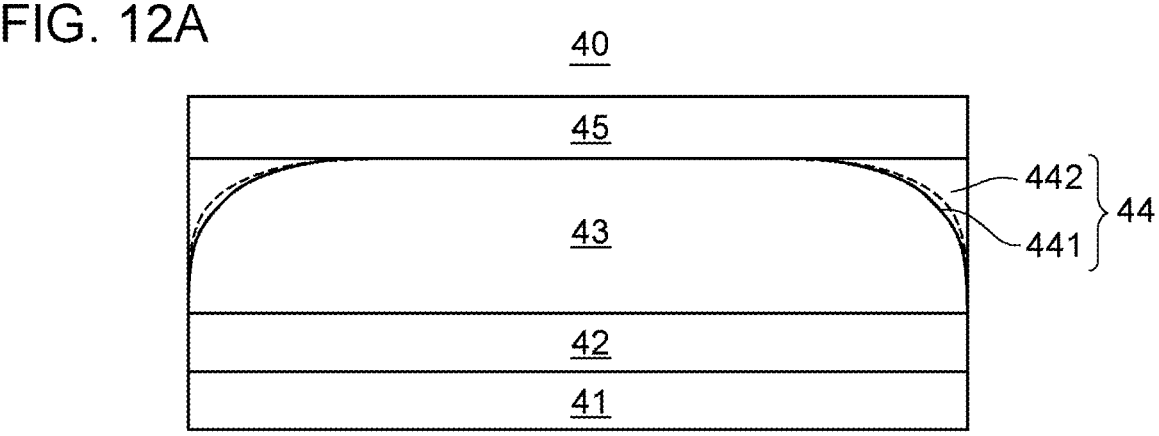
FIG. 12A is a schematic diagram of a GND filter according to a fourth example.
Figure 12B:
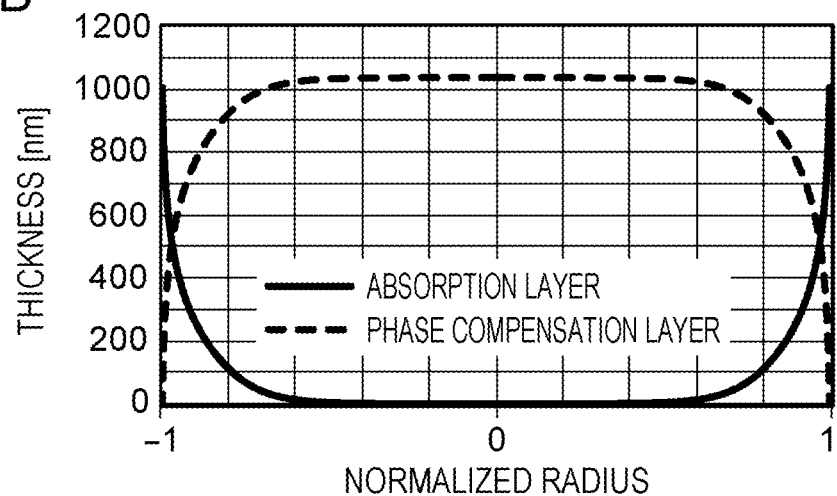
FIG. 12B illustrates the thickness of an absorption layer and the thickness of a phase compensation layer.
Figure 12C:
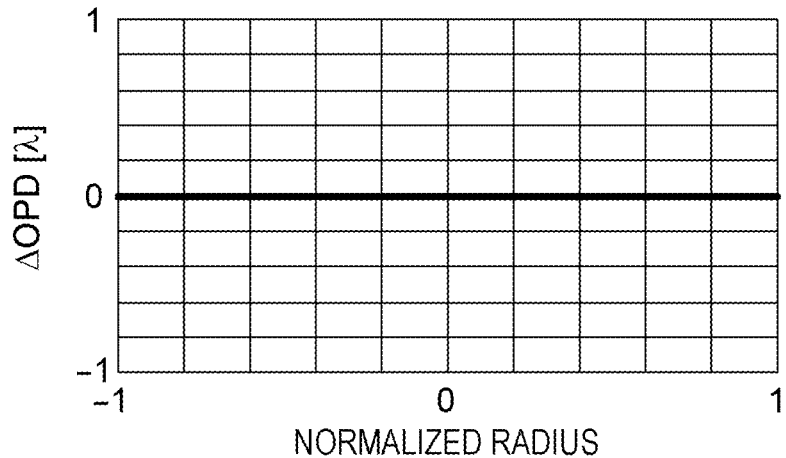
FIG. 12C illustrates ΔOPD.

When the phase compensation layer 43 is disposed at a position adjacent to an absorption layer 44 as illustrated in FIG. 12A, it is preferable that the following conditional expression (10) be satisfied.

$$|N_{abs,c} - N_{cmp}| < 0.15 \tag{10}$$

In the above, $N_{abs,c}$ is the refractive index of a film within the absorption layer 44 that is adjacent to the phase compensation layer 43 with respect to light at a wavelength of 550 nm. As the expression (10) is satisfied, the reflectance at the interface between the phase compensation layer 43 and the absorption layer 44 can be reduced, and the change in the reflectance associated with a change in the thickness of the phase compensation layer 43 can be reduced as a result. It is more preferable that the range in the expression (10) be set to the following range.

$$|N_{abs,c} - N_{cmp}| < 0.10 \tag{10a}$$

Next, a method of fabricating the GND filter 10 according to the present exemplary embodiment will be described.

Vapor deposition is an example of a method of forming the absorption layer 13. For example, a thin film made of titanium oxide having such characteristics as illustrated in FIGS. 4A and 4B can be formed by depositing $Ti_3O_5$ at an appropriate partial oxygen pressure. A thin film made of niobium oxide having such characteristics as illustrated in FIGS. 4A and 4B can be obtained by depositing $Nb_2O_5$ in a vacuum. A film made of tantalum oxide having such characteristics as illustrated in FIGS. 4A and 4B can be obtained by depositing $Ta_2O_5$ in a vacuum.

When the absorption layer 13 is formed through vapor deposition, the thickness of the absorption layer 13 can be varied by producing a temperature gradient in the substrate 11 or by inserting a mask between a target and the substrate 11.

The method of forming the absorption layer 13 is not limited to vapor deposition and may be selected in accordance with the characteristics of the materials. Other examples of the method of forming the absorption layer 13 include sputtering, plating, and spin-coating.

After the absorption layer 13 is formed in this manner, the surface layer 14 is formed through vapor deposition, sputtering, or the like. At this point, if the hollow film described above is used as the first film 14c of the surface layer 14, the hollow film may be formed through a sol-gel process or the like after the films other than the first film 14c have been laminated through vapor deposition, sputtering, or the like. The liquid of a raw material for the hollow film is first applied through spin-coating or the like, the raw material is then heated by an electric furnace, a hot plate, or the like, and thus the hollow film can be formed.

Figure 7A:
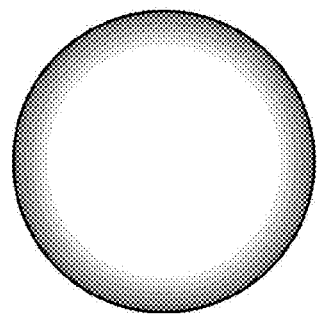
FIGS. 7A, 7B, 7C, and 7D illustrate examples of transmittance distribution.
Figure 7B:
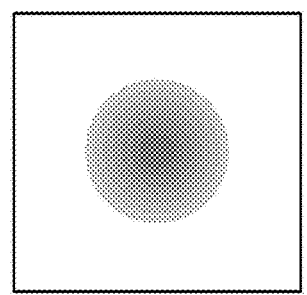
Figure 7C:
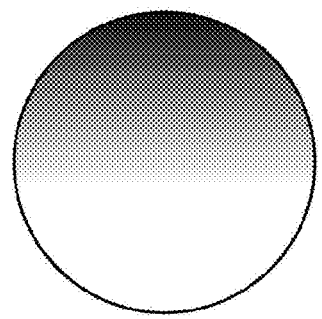
Figure 7D:
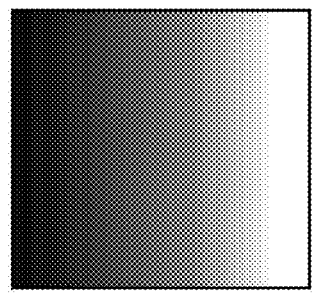

The GND filter 10 according to the present exemplary embodiment has transmittance distribution corresponding to the thickness of the absorption layer 13. The transmittance distribution of the GND filter 10 can take a variety of forms. For example, the transmittance distribution may have a concentric circle pattern as illustrated in FIGS. 7A and 7B, or the transmittance distribution may change unidirectionally as illustrated in FIGS. 7C and 7D. There are various other transmittance distribution patterns depending on the intended use, and the present exemplary embodiment can be applied to any desired transmittance distribution pattern.

Hereinafter, the characteristics of the GND filter according to the present exemplary embodiment will be described on the basis of the following examples.

First Example

The characteristics of a GND filter serving as an optical element according to a first example will be described. Table 1 shows the details of each film constituting the GND filter according to the first example.

TABLE 1

| FILM NUMBER | n | d [nm] | k | NOTES |
|---|---|---|---|---|
| — | 1.00000 | — | 0 | AIR |
| 9 | 1.38763 | 96.7 | 0 | SURFACE |
| 8 | 2.21365 | 21.4 | 0 | LAYER |
| 7 | 1.65958 | 15 | 0 | |
| 6 | 2.32468 | FILM THICKNESS DISTRIBUTION | 0.2005 | ABSORPTION LAYER |
| 5 | 2.12214 | FILM THICKNESS DISTRIBUTION | 0.1917 | |
| 4 | 1.65958 | 17.9 | 0 | INTERMEDIATE |
| 3 | 2.21365 | 22.5 | 0 | LAYER |
| 2 | 1.65958 | 51.4 | 0 | |
| 1 | 2.21365 | 6.2 | 0 | |
| — | 1.49830 | — | 0 | SUBSTRATE |

In Table 1, n is the refractive index with respect to light at a wavelength of 550 nm, k is the extinction coefficient with respect to light at a wavelength of 550 nm, and d is the thickness of the thin film. These apply in the same manner in the following examples as well.

In the GND filter according to the present example, the surface layer is constituted by three thin films, and the intermediate layer is constituted by four thin films.

Table 1 reveals that the first film in the surface layer satisfies the expression (1). The second film and the third film are laminated adjacent to each other.

The absorption layer is constituted by two absorption films in order to reduce the wavelength dependence of the transmittance. The first absorption film is made of titanium oxide, and the second absorption film is made of tantalum oxide. The extinction coefficients of titanium oxide and tantalum oxide according to the present example are as illustrated in FIG. 4A. It can be seen that the extinction coefficient of the absorption layer satisfies the expression (2) as the absorption layer is formed of titanium oxide and tantalum oxide illustrated in FIG. 4A.

The thickness of the first absorption film and the thickness of the second absorption film each vary in accordance with the position on the substrate. The ratio of the thickness of the first absorption film and the thickness of the second absorption film is 1:1. The thickness of the absorption layer is 1000 nm at the position of the maximum thickness. Specifically, the thickness of the first absorption film and the thickness of the second absorption film at this position are both 500 nm.

Figure 8A:
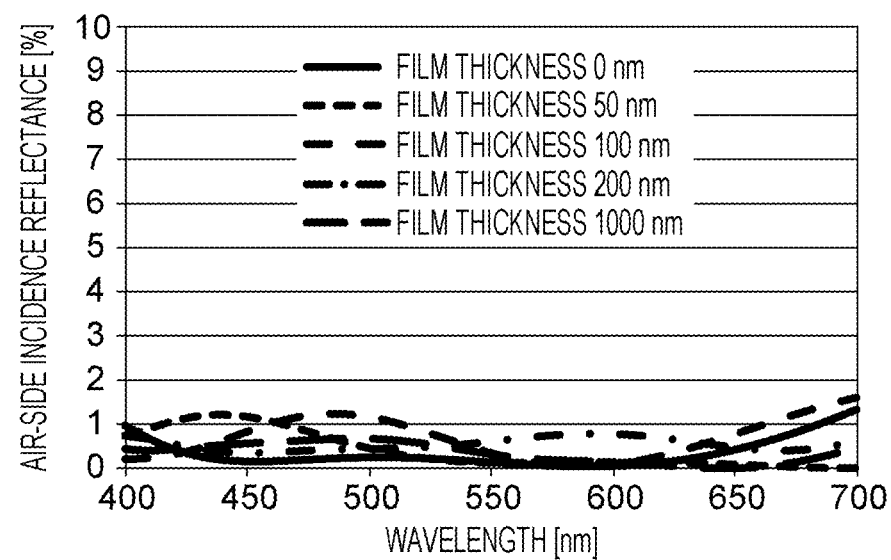
FIGS. 8A, 8B, and 8C illustrate wavelength dependence of the reflectance and the transmittance of a GND filter according to a first example.
Figure 8B:
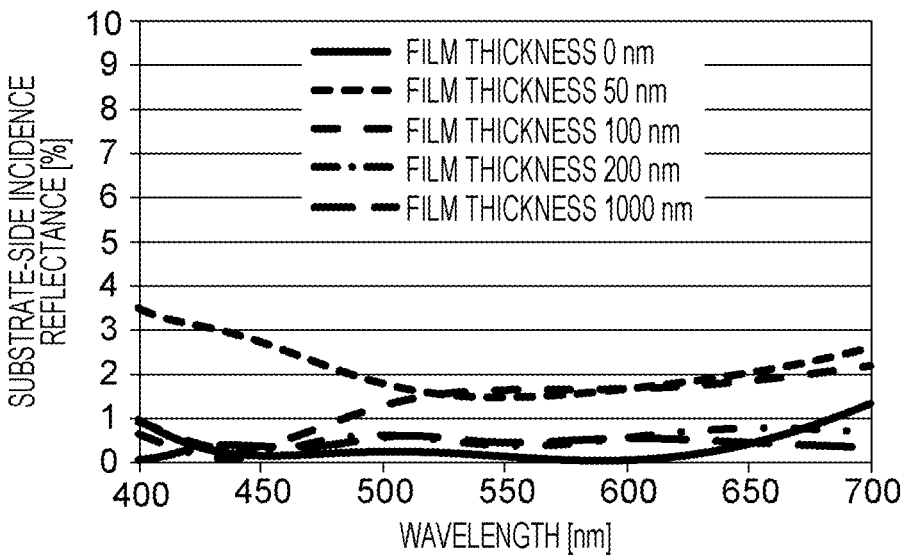
Figure 8C:
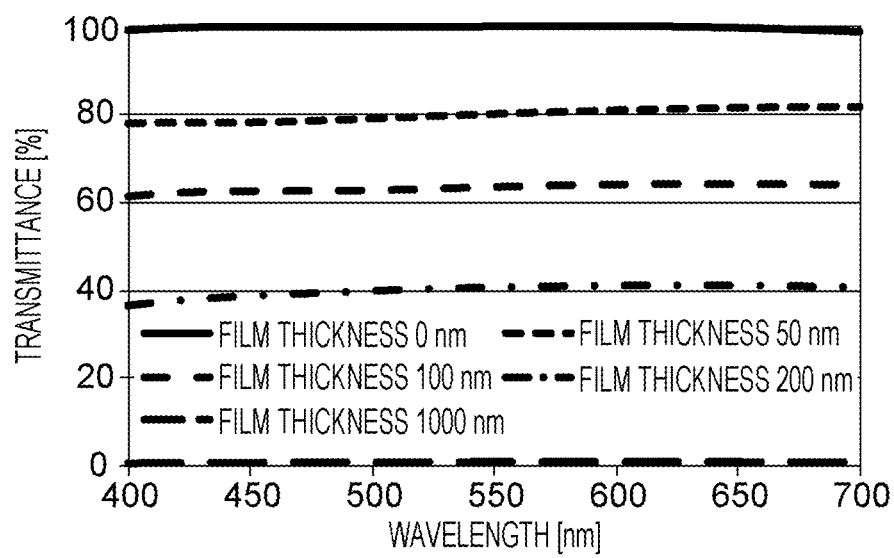

FIGS. 8A, 8B, and 8C illustrate the wavelength dependence of the reflectance and the transmittance of the GND filter according to the present example. FIG. 8A illustrates the reflectance when light is incident from the air side, FIG. 8B illustrates the reflectance when light is incident from the substrate side, and FIG. 8C illustrates the transmittance. In each of FIGS. 8A, 8B, and 8C, the solid line represents a case in which the thickness of the absorption layer 13 is 0 nm, the dotted line represents a case in which the thickness is 50 nm, the dashed line represents a case in which the thickness is 100 nm, the dashed-dotted line represents a case in which the thickness is 200 nm, and the long dashed line represents a case in which the thickness is 1000 nm.

As illustrated in FIGS. 8A and 8B, in the GND filter according to the present example, the reflectance is no more than 4% in both cases of air-side incidence and substrate-side incidence. In particular, the reflectance is no more than 2% near 550 nm, at which the spectral luminous efficiency is high, regardless of the transmittance of the absorption layer. In this manner, it can be seen that the change in the reflectance associated with a change in the transmittance of the absorption layer is small. Furthermore, as illustrated in FIG. 8C, the change in the wavelength dependence of the transmittance associated with a change in the transmittance of the absorption layer is small, showing a flat transmittance. This is because the absorption layer includes the first absorption film and the second absorption film that satisfy the expression (6a) and the expression (6b), respectively.

Second Example

Next, a GND filter serving as an optical element according to a second example will be described. Table 2 shows the details of each film constituting the GND filter according to the second example.

TABLE 2

| FILM NUMBER | n | d [nm] | k | NOTES |
|---|---|---|---|---|
| — | 1.00000 | — | 0 | AIR |
| 11 | 1.24971 | 106.5 | 0 | SURFACE LAYER |
| 10 | 2.21365 | 6.2 | 0 | |
| 9 | 1.65958 | 37.4 | 0 | |
| 8 | 2.21365 | 14.6 | 0 | |
| 7 | 1.65958 | 12.9 | 0 | |
| 6 | 2.34189 | FILM THICKNESS DISTRIBUTION | 0.1575 | ABSORPTION LAYER |
| 5 | 2.12214 | FILM THICKNESS DISTRIBUTION | 0.1917 | |
| 4 | 2.21365 | 16.8 | 0 | INTERMEDIATE LAYER |
| 3 | 1.65958 | 15.9 | 0 | |
| 2 | 2.21365 | 17.3 | 0 | |
| 1 | 1.65958 | 78.1 | 0 | |
| — | 1.49830 | — | 0 | SUBSTRATE |

In the GND filter according to the second example, the surface layer is constituted by five thin films, and the intermediate layer is constituted by four thin films. The refractive index of the first film is lower in the second example than in the first example. The second example also differs from the first example in that the third film and the second film are laminated in an alternating manner for a total of four films.

The absorption layer is constituted by two absorption films in order to reduce the wavelength dependence of the transmittance. The first absorption film is made of titanium oxide, and the second absorption film is made of niobium oxide. The extinction coefficients of titanium oxide and niobium oxide according to the present example are as illustrated in FIG. 4A. It can be seen that the extinction coefficient of the absorption layer satisfies the expression (2) as the absorption layer is formed of titanium oxide and niobium oxide illustrated in FIG. 4A.

The thickness of the first absorption film and the thickness of the second absorption film each vary in accordance with the position on the substrate. The ratio of the thickness of the first absorption film and the thickness of the second absorption film is 1:2. The thickness of the absorption layer is 1000 nm at the position of the maximum thickness. Specifically, at this position, the thickness of the first absorption film is 333 nm, and the thickness of the second absorption film is 667 nm.

Figure 9A:
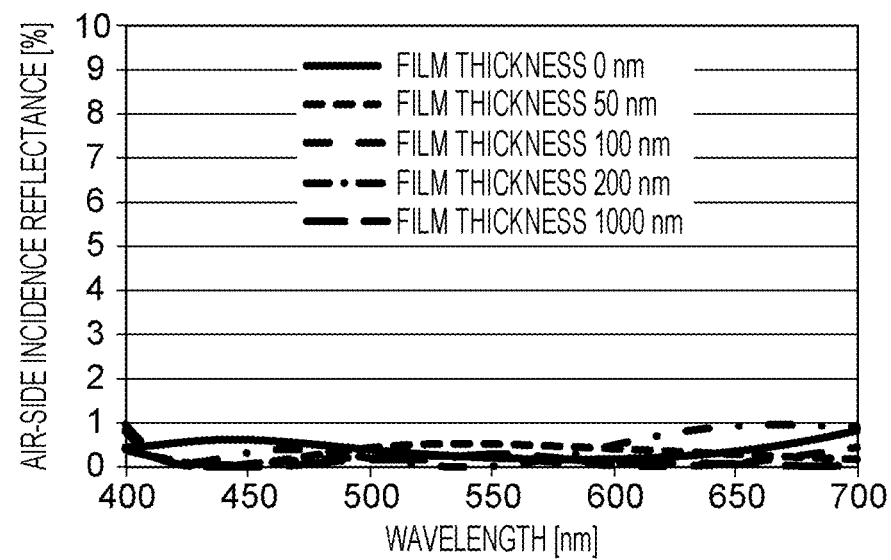
FIGS. 9A, 9B, and 9C illustrate wavelength dependence of the reflectance and the transmittance of a GND filter according to a second example.
Figure 9B:
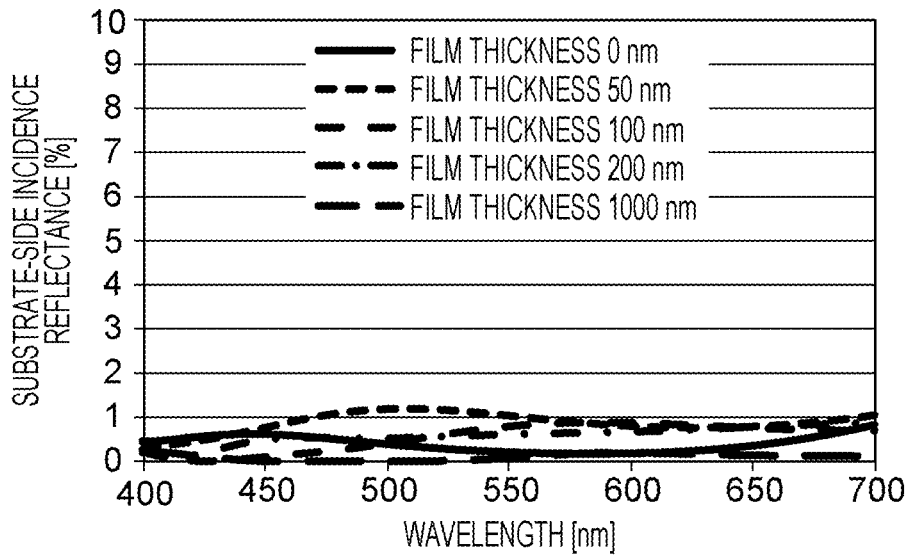
Figure 9C:
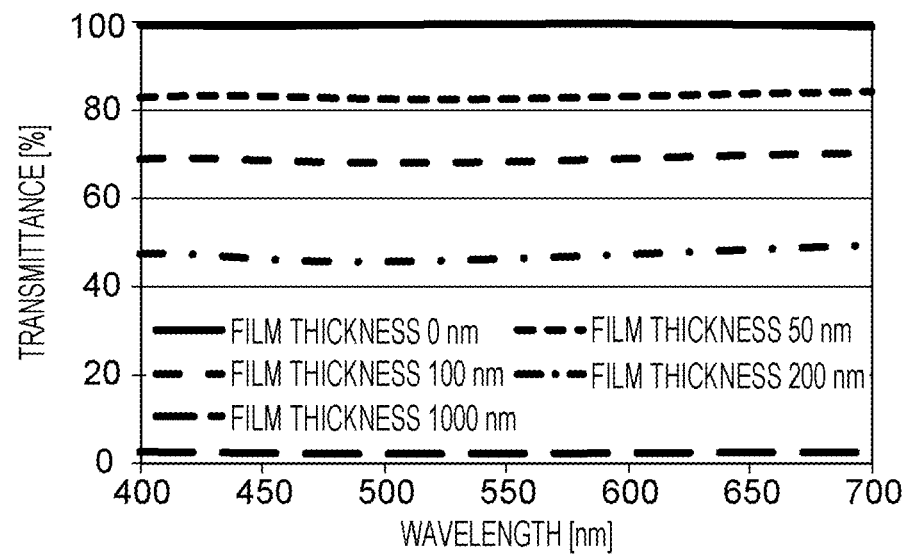

FIGS. 9A, 9B, and 9C illustrate the wavelength dependence of the reflectance and the transmittance of the GND filter according to the present example. FIG. 9A illustrates the reflectance when light is incident from the air side, FIG. 9B illustrates the reflectance when light is incident from the substrate side, and FIG. 9C illustrates the transmittance. In each of FIGS. 9A, 9B, and 9C, the solid line represents a case in which the thickness of the absorption layer is 0 nm, the dotted line represents a case in which the thickness is 50 nm, the dashed line represents a case in which the thickness is 100 nm, the dashed-dotted line represents a case in which the thickness is 200 nm, and the long dashed line represents a case in which the thickness is 1000 nm.

As illustrated in FIGS. 9A and 9B, in the GND filter according to the present example, the reflectance is no more than 1.5% in both cases of air-side incidence and substrate-side incidence. In other words, the reflectance can be further reduced in the present example than in the first example. This is because the refractive index of the first film is decreased and the number of laminated films of the second film and the third film is increased.

Third Example

Next, a GND filter serving as an optical element according to a third example will be described. FIG. 10A illustrates a schematic diagram of a GND filter 30 according to the present example. The GND filter 30 includes a phase compensation layer 32, an intermediate layer 33, an absorption layer 34, and a surface layer 35 arranged in this order from the side closer to a substrate 31. In other words, the GND filter 30 according to the present example differs from that of the second example in that the phase compensation layer 32 is provided. Table 3 shows the details of each film constituting the GND filter 30 according to the third example.

TABLE 3

| FILM NUMBER | n | d [nm] | k | NOTES |
|---|---|---|---|---|
| — | 1.00000 | — | 0 | AIR |
| 12 | 1.24971 | 110.5 | 0 | SURFACE LAYER |
| 11 | 2.21365 | 12.1 | 0 | |
| 10 | 1.65958 | 37.9 | 0 | |
| 9 | 2.21365 | 23.3 | 0 | |
| 8 | 1.65958 | 6.4 | 0 | |
| 7 | 2.34189 | FILM THICKNESS DISTRIBUTION | 0.1575 | ABSORPTION LAYER |
| 6 | 2.12214 | FILM THICKNESS DISTRIBUTION | 0.1917 | |
| 5 | 1.65958 | 8.7 | 0 | INTERMEDIATE LAYER |
| 4 | 2.21365 | 25.8 | 0 | |
| 3 | 1.65958 | 36.4 | 0 | |
| 2 | 2.21365 | 9.2 | 0 | |
| 1 | 1.65958 | FILM THICKNESS DISTRIBUTION | 0 | PHASE COMPENSATION LAYER |
| — | 1.65397 | — | 0 | SUBSTRATE |

In the GND filter 30 according to the third example, the surface layer is constituted by five thin films, and the intermediate layer is constituted by four thin films.

The absorption layer 34 is constituted by two absorption films in order to reduce the wavelength dependence of the transmittance. A first absorption film 34a is made of titanium oxide, and a second absorption film 34b is made of niobium oxide. The extinction coefficients of titanium oxide and niobium oxide according to the present example are as illustrated in FIG. 4A. It can be seen that the extinction coefficient of the absorption layer 34 satisfies the expression (2) as the absorption layer 34 is formed of titanium oxide and niobium oxide illustrated in FIG. 4A.

The thickness of the first absorption film 34a and the thickness of the second absorption film 34b each vary in accordance with the position on the substrate. The ratio of the thickness of the first absorption film 34a and the thickness of the second absorption film 34b is 1:2. The thickness of the absorption layer 34 is 1000 nm at the position of the maximum thickness. Specifically, at this position, the thickness of the first absorption film 34a is 333 nm, and the thickness of the second absorption film 34b is 667 nm.

Figure 11A:
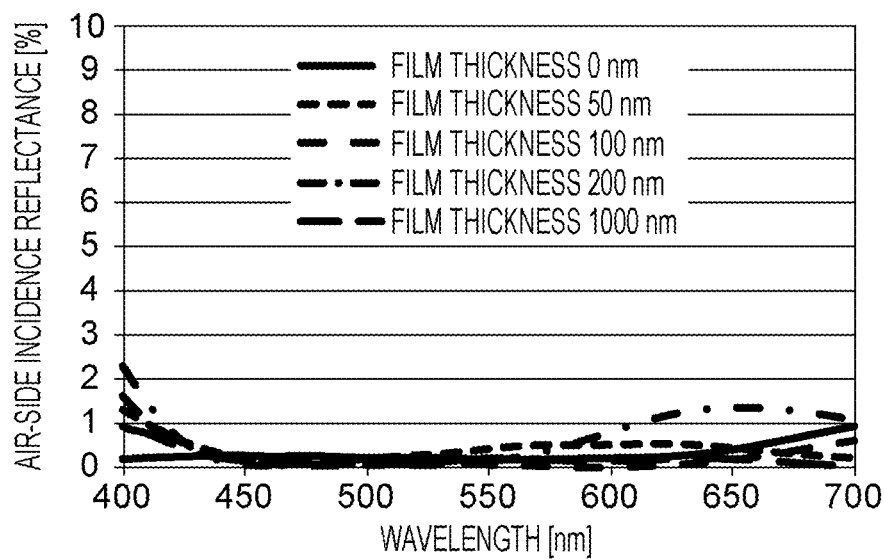
FIGS. 11A, 11B, and 11C illustrate wavelength dependence of the reflectance and the transmittance of the GND filter according to the third example.
Figure 11B:
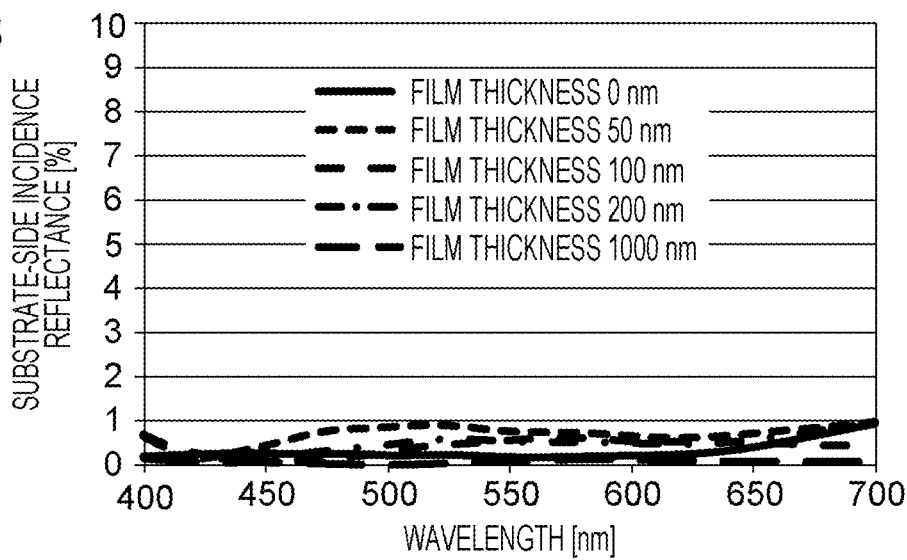
Figure 11C:
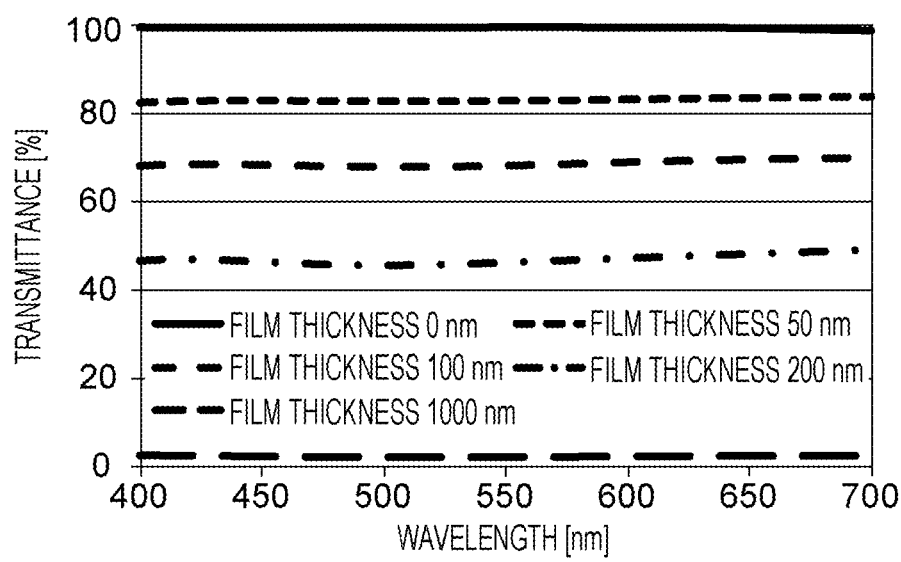

FIGS. 11A, 11B, and 11C illustrate the wavelength dependence of the reflectance and the transmittance of the GND filter 30 according to the present example. FIG. 11A illustrates the reflectance when light is incident from the air side, FIG. 11B illustrates the reflectance when light is incident from the substrate side, and FIG. 11C illustrates the transmittance. In each of FIGS. 11A, 11B, and 11C, the solid line represents a case in which the thickness of the absorption layer is 0 nm, the dotted line represents a case in which the thickness is 50 nm, the dashed line represents a case in which the thickness is 100 nm, the dashed-dotted line represents a case in which the thickness is 200 nm, and the long dashed line represents a case in which the thickness is 1000 nm.

As illustrated in FIGS. 11A and 11B, in the GND filter 30 according to the present example, the reflectance is no more than 4% in both cases of air-side incidence and substrate-side incidence. In particular, the reflectance is no more than 2% near 550 nm, at which the spectral luminous efficiency is high, regardless of the transmittance of the absorption layer 34, and it can be seen that the change in the reflectance associated with a change in the transmittance of the absorption layer 34 is small.

Fourth Example

Next, a GND filter serving as an optical element according to a fourth example will be described. FIG. 12A illustrates a schematic diagram of a GND filter 40 according to the present example. The GND filter 40 includes an intermediate layer 42, a phase compensation layer 43, an absorption layer 44, and a surface layer 45 arranged in this order from the side closer to a substrate 41. In other words, the GND filter 40 according to the present example differs from that of the third example in terms of the position of the phase compensation layer 43. Table 4 shows the details of each film constituting the GND filter 40 according to the fourth example.

TABLE 4

| FILM NUMBER | n | d [nm] | k | NOTES |
| --- | --- | --- | --- | --- |
| — | 1.00000 | — | 0 | AIR |
| 12 | 1.24971 | 105.6 | 0 | SURFACE |
| 11 | 2.21365 | 4.7 | 0 | LAYER |
| 10 | 1.65958 | 23.2 | 0 | |
| 9 | 2.21365 | 11.7 | 0 | |
| 8 | 1.65958 | 29.7 | 0 | |
| 7 | 2.34189 | FILM THICKNESS DISTRIBUTION | 0.1575 | ABSORPTION LAYER |
| 6 | 2.12214 | FILM THICKNESS DISTRIBUTION | 0.1917 | |
| 5 | 2.21365 | FILM THICKNESS DISTRIBUTION | 0 | PHASE COMPENSATION LAYER |
| 4 | 1.65958 | 9.9 | 0 | INTERMEDIATE |
| 3 | 2.21365 | 26.2 | 0 | LAYER |
| 2 | 1.65958 | 20 | 0 | |
| 1 | 2.21365 | 12.6 | 0 | |
| — | 1.80768 | — | | SUBSTRATE |

In the GND filter 40 according to the fourth example, the surface layer is constituted by five thin films, and the intermediate layer is constituted by four thin films.

The absorption layer 44 is constituted by two absorption films in order to reduce the wavelength dependence of the transmittance. A first absorption film 44a is made of titanium oxide, and a second absorption film 44b is made of niobium oxide. The extinction coefficients of titanium oxide and niobium oxide according to the present example are as illustrated in FIG. 4A. It can be seen that the extinction coefficient of the absorption layer 44 satisfies the expression (2) as the absorption layer 44 is formed of titanium oxide and niobium oxide illustrated in FIG. 4A.

The thickness of the first absorption film 44a and the thickness of the second absorption film 44b each vary in accordance with the position on the substrate. The ratio of the thickness of the first absorption film 44a and the thickness of the second absorption film 44b is 1:2. The thickness of the absorption layer 44 is 1000 nm at the position of the maximum thickness. Specifically, at this position, the thickness of the first absorption film 44a is 333 nm, and the thickness of the second absorption film 44b is 667 nm.

Figure 13A:
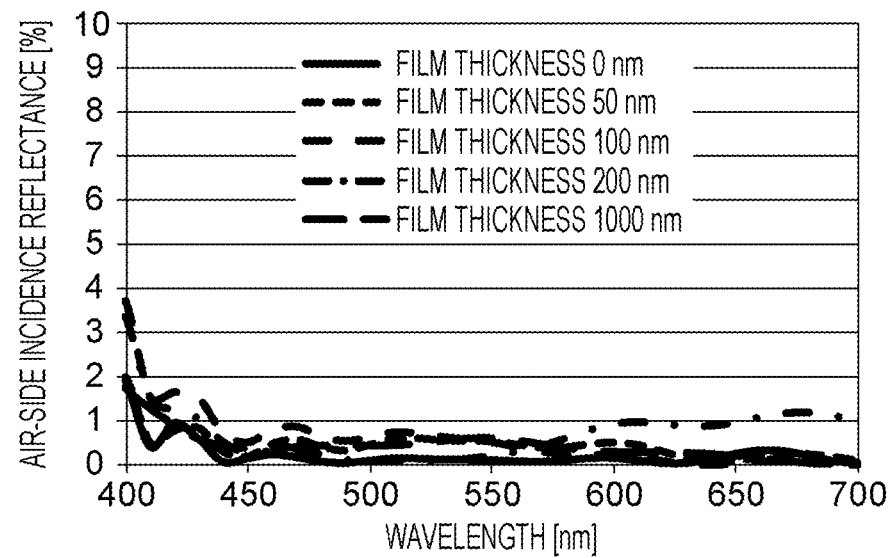
FIGS. 13A, 13B, and 13C illustrate wavelength dependence of the reflectance and the transmittance of the GND filter according to the fourth example.
Figure 13B:
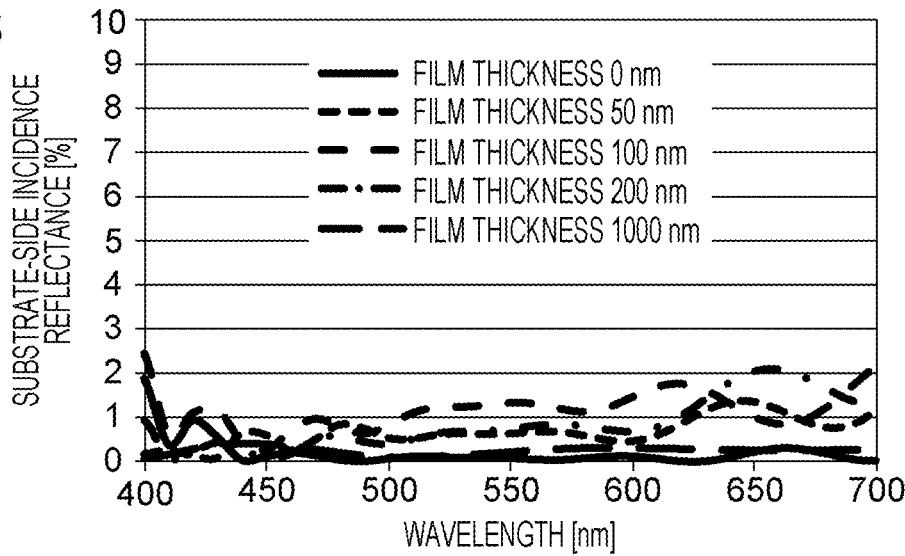
Figure 13C:
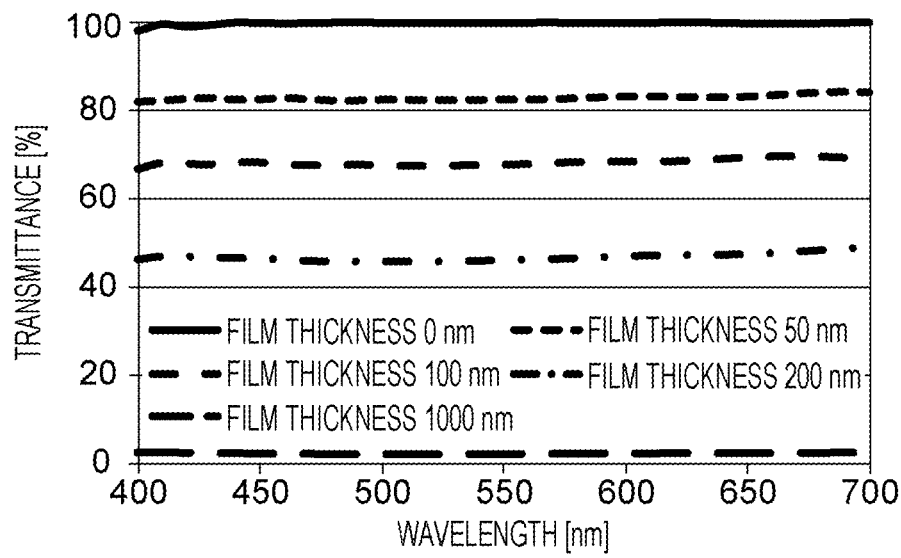

FIGS. 13A, 13B, and 13C illustrate the wavelength dependence of the reflectance and the transmittance of the GND filter 40 according to the present example. FIG. 13A illustrates the reflectance when light is incident from the air side, FIG. 13B illustrates the reflectance when light is incident from the substrate side, and FIG. 13C illustrates the transmittance. In each of FIGS. 13A, 13B, and 13C, the solid line represents a case in which the thickness of the absorption layer 44 is 0 nm, the dotted line represents a case in which the thickness is 50 nm, the dashed line represents a case in which the thickness is 100 nm, the dashed-dotted line represents a case in which the thickness is 200 nm, and the long dashed line represents a case in which the thickness is 1000 nm.

As illustrated in FIGS. 13A and 13B, in the GND filter 40 according to the present example, the reflectance is no more than 4% in both cases of air-side incidence and substrate-side incidence. In particular, the reflectance is no more than 2% near 550 nm, at which the spectral luminous efficiency is high, regardless of the transmittance of the absorption layer 44, and it can be seen that the change in the reflectance associated with a change in the transmittance of the absorption layer 44 is small.

Optical System

Next, an optical system according to an example of the present invention will be described.

Figure 14A:
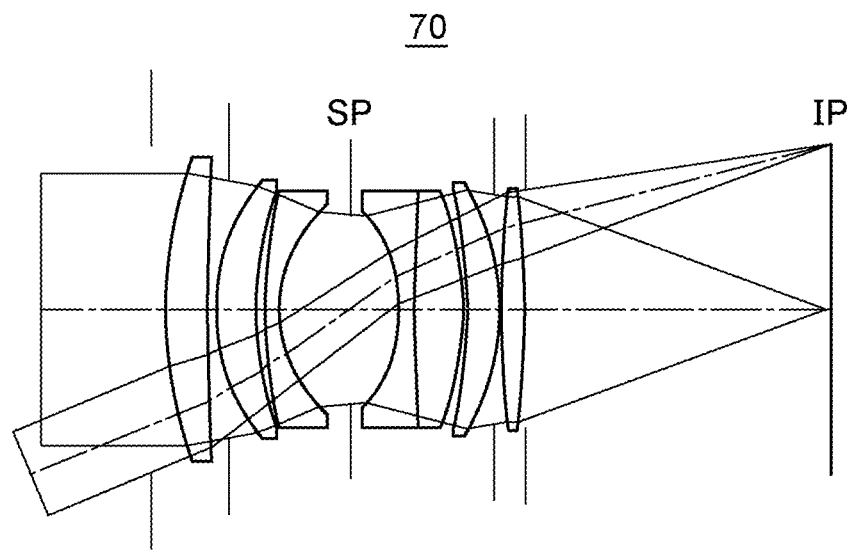
FIG. 14A is a sectional view of an optical system.

FIG. 14A is a sectional view of an optical system 70 according to the present example. The optical system 70 includes lenses serving as a plurality of optical elements. Light from an object is transmitted through the optical system 70 and imaged on an imaging plane IP.

At least one of the plurality of lenses in the optical system 70 is constituted by any one of the GND filters according to the first through fourth examples described above.

The GND filters according to the first through fourth examples reduce the change in the reflectance associated with a change in the transmittance of the absorption layer. Therefore, an occurrence of ghost, flare, or the like can be suppressed, and a high-quality image can be obtained.

The optical system 70 is a coaxial and rotationally symmetric optical system, and a concentric circular transmittance distribution pattern such as the one illustrated in FIG. 7A or 7B is preferable in such an optical system. In addition, providing a region in which an absorption layer is not formed at the center portion of the GND filter, as illustrated in FIG. 1, 10A, or 12A, makes it possible to suppress a decrease in the quantity of transmitted light through the GND filter. In that case, a light beam transmitted through the center portion of the GND filter does not experience modulation of the transmittance caused by the GND filter. Therefore, when an image pickup apparatus provided with the optical system 70 includes a phase-difference autofocus mechanism, autofocus can be achieved by using a light beam that has been transmitted through the center portion of the GND filter.

A high-quality blurred image can be obtained through an apodization effect when a GND filter having transmittance distribution of $T(r_1) > T(r_2)$ is disposed in the optical system 70, in which $T(r_1)$ and $T(r_2)$ are the transmittances at distances $r_1$ and $r_2$ ($r_1 < r_2$) from the center of an optical surface or from the optical axis of the optical element.

When at least one such GND filter is disposed at each of the light-incident side and the light-exit side of an aperture stop SP, the apodization effect can be obtained effectively on an off-axis light beam as well, and a high-quality image can be obtained throughout the screen.

In addition, providing a region in which an absorption layer is not formed at the center portion of the GND filter makes it possible to obtain a large blurred image while improving the blurred image through the apodization effect.

In contrast, when a GND filter having transmittance distribution of $T(r_1)<T(r_2)$ is disposed in the optical system 70, peripheral illumination can be corrected.

Next, an image pickup apparatus provided with the optical system 70 according to the present example will be described.

Figure 14B:
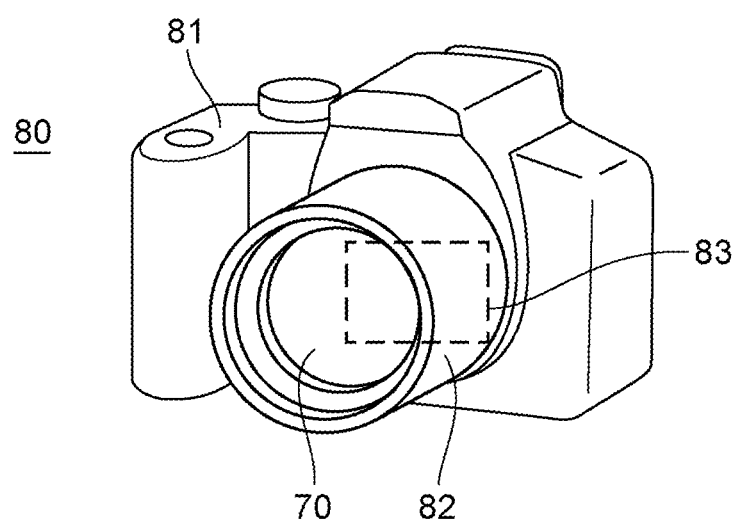
FIG. 14B is a schematic diagram of an image pickup apparatus.

FIG. 14B illustrates a digital camera 80 serving as the image pickup apparatus according to the present example. The digital camera 80 includes a lens unit 82, and the optical system 70 according to the example described above is provided in the lens unit 82. An image sensor 83 such as a charge-coupled device (CCD) or complementary metal-oxide semiconductor (CMOS) sensor is disposed in a main body 81 so as to lie on the imaging plane IP of the optical system 70.

As the digital camera 80 includes the optical system 70, an occurrence of ghost, flare, or the like can be suppressed, and a high-quality image can be obtained.

Although FIG. 14B illustrates an example in which the main body 81 and the lens unit 82 are integrated, the present invention may also be applied to a lens apparatus that can be attached to or detached from the image pickup apparatus main body. Such a lens apparatus is used, for example, as an interchangeable lens for a single-lens camera. In this case, the illustration in FIG. 14B can be regarded as a state in which the lens apparatus 82 provided with the optical system 70 is mounted on the image pickup apparatus main body 81.

It is to be noted that the optical system according to the example of the present invention can also be applied to an apparatus other than the image pickup apparatus such as a digital camera or the lens apparatus (interchangeable lens) that can be attached to or detached from the image pickup apparatus main body. For example, the optical system according to the example of the present invention may be applied to binoculars, a microscope, or the like.

Thus far, exemplary embodiments and examples of the present invention have been described, but the present invention is not limited to these exemplary embodiments and examples, and various combinations, modifications, and changes can be made within the spirit of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-072992 filed Mar. 31, 2016 and No. 2016-148938 filed Jul. 28, 2016, which are hereby incorporated by reference herein in their entirety.

What is claimed is:

1. An optical element, comprising:
   a substrate;
   a surface layer disposed on the substrate;
   an absorption layer provided between the surface layer and the substrate, the absorption layer having transmittance that varies depending on a position on the substrate; and
   an intermediate layer provided between the substrate and the absorption layer;
   wherein the surface layer includes:
      a first film disposed at a position farthest from the substrate and having a refractive index of no less than 1.05 nor more than 1.4 at a wavelength of 550 nm,
      a second film disposed at a position closer to the substrate than the first film and having a higher refractive index than the substrate at a wavelength of 550 nm, and
      a third film disposed at a position adjacent to the second film and having a lower refractive index than the second film at a wavelength of 550 nm, and
   wherein an extinction coefficient of the absorption layer is not more than 0.5 and not less than 0.05 at wavelengths of from 400 nm to 700 nm, and
   wherein the intermediate layer includes a film having a refractive index in a range between $N_{abs,int}$ and $N_{sub}$, wherein $N_{abs,int}$ is a refractive index of a film of the absorption layer that is closest to the intermediate layer, and $N_{sub}$ is a refractive index of the substrate.

2. The optical element according to claim 1,
   wherein an absolute value of a difference between the refractive indices of the second film and the third film that are adjacent to each other is no less than 0.4.

3. The optical element according to claim 1,
   wherein the following conditional expression is satisfied at a wavelength of 550 nm $|Re(\eta_{sub})/Y_0 - N_{abs,int}| < 0.25$, where $Re(\eta_{sub})$ is a real part of an equivalent admittance from the substrate to the intermediate layer, and $Y_0$ is an optical admittance in vacuum.

4. The optical element according to claim 1,
   wherein the optical element includes a region in which the absorption layer is not formed between the intermediate layer and the surface layer, and
   wherein the following conditional expression is satisfied at a wavelength of 550 nm $|Re(\eta_{sub})/Y_0 - Re(\eta_{air})/Y_0| < 0.3$, where $Re(\eta_{sub})$ is a real part of an equivalent admittance from the substrate to the intermediate layer, $Re(\eta_{air})$ is a real part of an equivalent admittance from air to the surface layer, and $Y_0$ is an optical admittance in vacuum.

5. The optical element according to claim 1,
   wherein the following conditional expression is satisfied at a wavelength of 550 nm $|Re(\eta_{air})/Y_0 - N_{abs,sur}| < 0.25$, where $Re(\eta_{air})$ is a real part of an equivalent admittance from air to the surface layer, $Y_0$ is an optical admittance in vacuum, and $N_{abs,sur}$ is a refractive index of a film among films constituting the absorption layer that is closest to the surface layer.

6. The optical element according to claim 1,
   wherein the first film has an air gap formed thereinside.

7. The optical element according to claim 1,
   wherein the first film contains one of silica and magnesium fluoride.

8. The optical element according to claim 1,
   wherein the absorption layer includes
      a first material of which an absorption coefficient is smaller at a wavelength of 400 nm than at a wavelength of 700 nm, and a second material of which an absorption coefficient is greater at a wavelength of 400 nm than at a wavelength of 700 nm.

9. The optical element according to claim 1, wherein the absorption layer contains titanium oxide and one of niobium oxide and tantalum oxide.

10. The optical element according to claim 1, wherein the absorption layer has a thickness that varies depending on a position on the substrate.

11. The optical element according to claim 10, further comprising:
a phase compensation layer having a thickness that varies depending on a position on the substrate,
wherein the thickness of the phase compensation layer increases in a direction opposite to a direction in which the thickness of the absorption layer increases.

12. The optical element according to claim 11, wherein the phase compensation layer is disposed at a position adjacent to the substrate, and
wherein the following conditional expression is satisfied $|N_{sub}-N_{cmp}|<0.10$, wherein $N_{sub}$ is a refractive index of the substrate and $N_{cmp}$ is a refractive index of the phase compensation layer.

13. The optical element according to claim 11, wherein the phase compensation layer is disposed at a position adjacent to the absorption layer, and
wherein the following conditional expression is satisfied $|N_{abs,c}-N_{cmp}|<0.15$, wherein $N_{abs,c}$ is a refractive index of a film among films constituting the absorption layer that is adjacent to the phase compensation layer, and $N_{cmp}$ is a refractive index of the phase compensation layer.

14. The optical element according to claim 1, wherein a region in which transmittance of the absorption layer is distributed in a concentric circle pattern.

15. The optical element according to claim 14, wherein the absorption layer is not formed at a center of the concentric circle.

16. The optical element according to claim 1, wherein the substrate is a lens.

17. An optical system, comprising:
an optical element that includes
a substrate,
a surface layer disposed on the substrate,
an absorption layer provided between the surface layer and the substrate, the absorption layer having transmittance that varies depending on a position on the substrate, and
an intermediate layer provided between the substrate and the absorption layer,
wherein the surface layer includes:
a first film disposed at a position farthest from the substrate and having a refractive index of no less than 1.05 nor more than 1.4 at a wavelength of 550 nm,
a second film disposed at a position closer to the substrate than the first film and having a higher refractive index than the substrate at a wavelength of 550 nm, and
a third film disposed at a position adjacent to the second film and having a lower refractive index than the second film at a wavelength of 550 nm, and
wherein an extinction coefficient of the absorption layer is not more than 0.5 and not less than 0.05 at wavelengths of from 400 nm to 700 nm, and
wherein the intermediate layer includes a film having a refractive index in a range between $N_{abs,int}$ and $N_{sub}$, where $N_{abs,int}$ is a refractive index of a film of the absorption layer that is closest to the intermediate layer, and $N_{sub}$ is a refractive index of the substrate.

18. The optical system according to claim 17, further comprising:
an aperture stop,
wherein at least one said optical element is disposed at each of a light-incident side and a light-exit side of the aperture stop.

19. An image pickup apparatus, comprising:
an image sensor; and
an optical system,
wherein the optical system includes an optical element,
wherein the optical element includes
a substrate,
a surface layer disposed on the substrate,
an absorption layer provided between the surface layer and the substrate, the absorption layer having transmittance that varies depending on a position on the substrate, and
an intermediate layer provided between the substrate and the absorption layer,
wherein the surface layer includes:
a first film disposed at a position farthest from the substrate and having a refractive index of no less than 1.05 nor more than 1.4 at a wavelength of 550 nm,
a second film disposed at a position closer to the substrate than the first film and having a higher refractive index than the substrate at a wavelength of 550 nm, and
a third film disposed at a position adjacent to the second film and having a lower refractive index than the second film at a wavelength of 550 nm, and
wherein an extinction coefficient of the absorption layer is not more than 0.5 and not less than 0.05 at wavelengths of from 400 nm to 700 nm, and
wherein the intermediate layer includes a film having a refractive index in a range between $N_{abs,int}$ and $N_{sub}$, where $N_{abs,int}$ is a refractive index of a film of the absorption layer that is closest to the intermediate layer, and $N_{sub}$ is a refractive index of the substrate.

* * * * *